(12) United States Patent
Nakagawa et al.

(10) Patent No.: US 10,816,887 B2
(45) Date of Patent: Oct. 27, 2020

(54) CONTROL DEVICE, IMAGE PROJECTION APPARATUS, AND CONTROL METHOD

(71) Applicants: Jun Nakagawa, Kanagawa (JP); Toshihiro Yamashiro, Kanagawa (JP); Takayuki Shitomi, Tokyo (JP)

(72) Inventors: Jun Nakagawa, Kanagawa (JP); Toshihiro Yamashiro, Kanagawa (JP); Takayuki Shitomi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 62 days.

(21) Appl. No.: 16/302,835

(22) PCT Filed: Jun. 14, 2017

(86) PCT No.: PCT/JP2017/022013
§ 371 (c)(1),
(2) Date: Nov. 19, 2018

(87) PCT Pub. No.: WO2017/221792
PCT Pub. Date: Dec. 28, 2017

(65) Prior Publication Data
US 2020/0174358 A1 Jun. 4, 2020

(30) Foreign Application Priority Data

Jun. 20, 2016 (JP) .................................. 2016-122097
Apr. 20, 2017 (JP) .................................. 2017-083681

(51) Int. Cl.
*G03B 21/20* (2006.01)
*G03B 21/00* (2006.01)
(52) U.S. Cl.
CPC ....... *G03B 21/2053* (2013.01); *G03B 21/008* (2013.01); *G03B 21/2033* (2013.01)

(58) Field of Classification Search
CPC .... G03B 21/008; G03B 21/28; G03B 21/147; G03B 21/2033; G03B 21/2053;
(Continued)

(56) References Cited

U.S. PATENT DOCUMENTS

2005/0024701 A1* 2/2005 Cannon ................ G02B 26/105
359/204.1
2009/0231656 A1 9/2009 Suzuki et al.
(Continued)

FOREIGN PATENT DOCUMENTS

CN 1404699 A 3/2003
CN 102104760 A 6/2011
(Continued)

OTHER PUBLICATIONS

International Search Report dated Oct. 2, 2017 in PCT/JP2017/022013 filed on Jun. 14, 2017.
(Continued)

*Primary Examiner* — Sultan Chowdhury
(74) *Attorney, Agent, or Firm* — Oblon, McClelland, Maier & Neustadt, L.L.P.

(57) ABSTRACT

A control device includes an acquirer, a timing detector, a controller, and a driver. The acquirer acquires an output voltage from a light detector for receiving laser light scanned by a light source and a deflector. The timing detector detects reference timings of the laser light on forward and backward paths in a scanning direction based on the output voltage. The controller generates a control signal for causing the light source and the deflector to draw a forward path image on a scanned surface from time obtained by adding a time to the reference timing on the forward path and to draw a backward path image on the surface from time obtained by adding a time to the reference
(Continued)

timing on the backward path. The driver draws the images by driving the deflector, based on the control signal.

12 Claims, 14 Drawing Sheets

(58) Field of Classification Search
CPC .............. G03B 21/2066; G02B 26/101; G02B 26/105; G02B 26/0816; G02B 26/0833; G02B 26/0841
See application file for complete search history.

(56) References Cited

U.S. PATENT DOCUMENTS

| | | |
|---|---|---|
| 2010/0118369 A1 | 5/2010 | Takayama |
| 2011/0064352 A1 | 3/2011 | Nakagawa et al. |
| 2011/0069367 A1 | 3/2011 | Sakai et al. |
| 2011/0176069 A1 | 7/2011 | Chamberlin et al. |
| 2012/0155824 A1 | 6/2012 | Suzuki et al. |
| 2012/0236379 A1* | 9/2012 | da Silva ................ G01S 7/4817 359/200.8 |
| 2015/0219500 A1* | 8/2015 | Maes ..................... G01J 5/0896 353/33 |
| 2016/0109697 A1 | 4/2016 | Nakagawa et al. |
| 2018/0290460 A1 | 10/2018 | Nakagawa et al. |

FOREIGN PATENT DOCUMENTS

| | | |
|---|---|---|
| EP | 2169443 | 3/2010 |
| JP | 2009-014791 A | 1/2009 |
| JP | 2010-079198 | 4/2010 |
| JP | 4620905 | 11/2010 |
| WO | 2017/104613 | 6/2017 |

OTHER PUBLICATIONS

Office Action dated Feb. 28, 2020, in corresponding Korean Patent Application No. 10-2018-7036896 (with English translation), citing document AO herein.
Office Action dated Jun. 3, 2020, in corresponding Chinese Patent Application No. 201780038127.4 (with English translation), citing document AO and AP therein, 19 pages.

* cited by examiner

[Fig. 1]
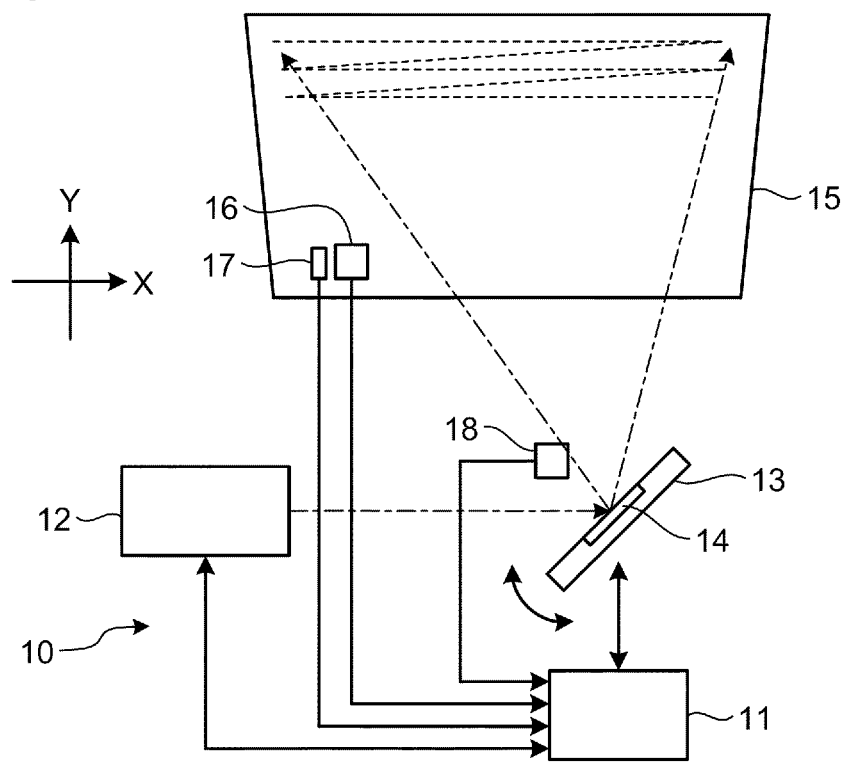

[Fig. 2]
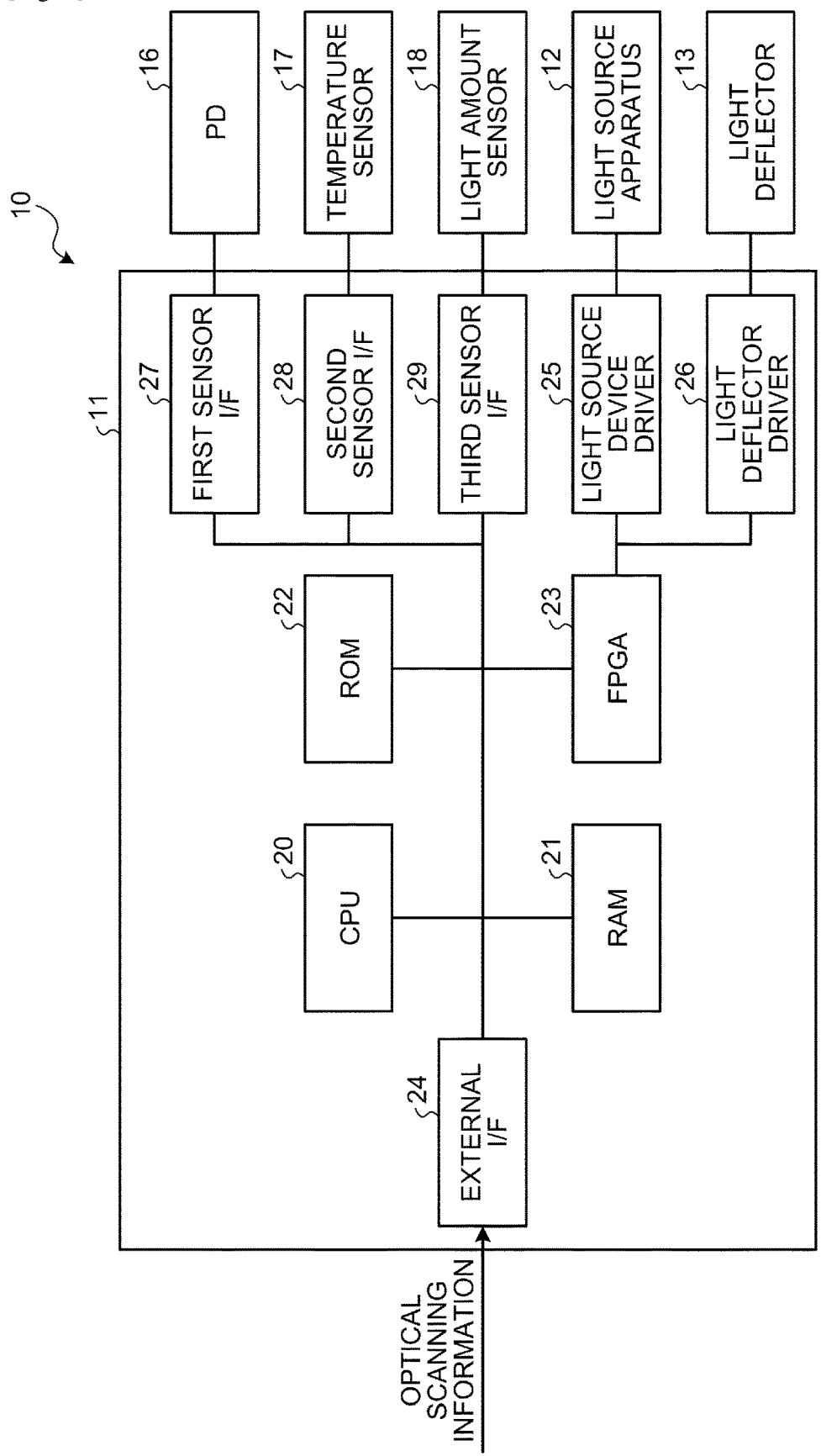

[Fig. 3]
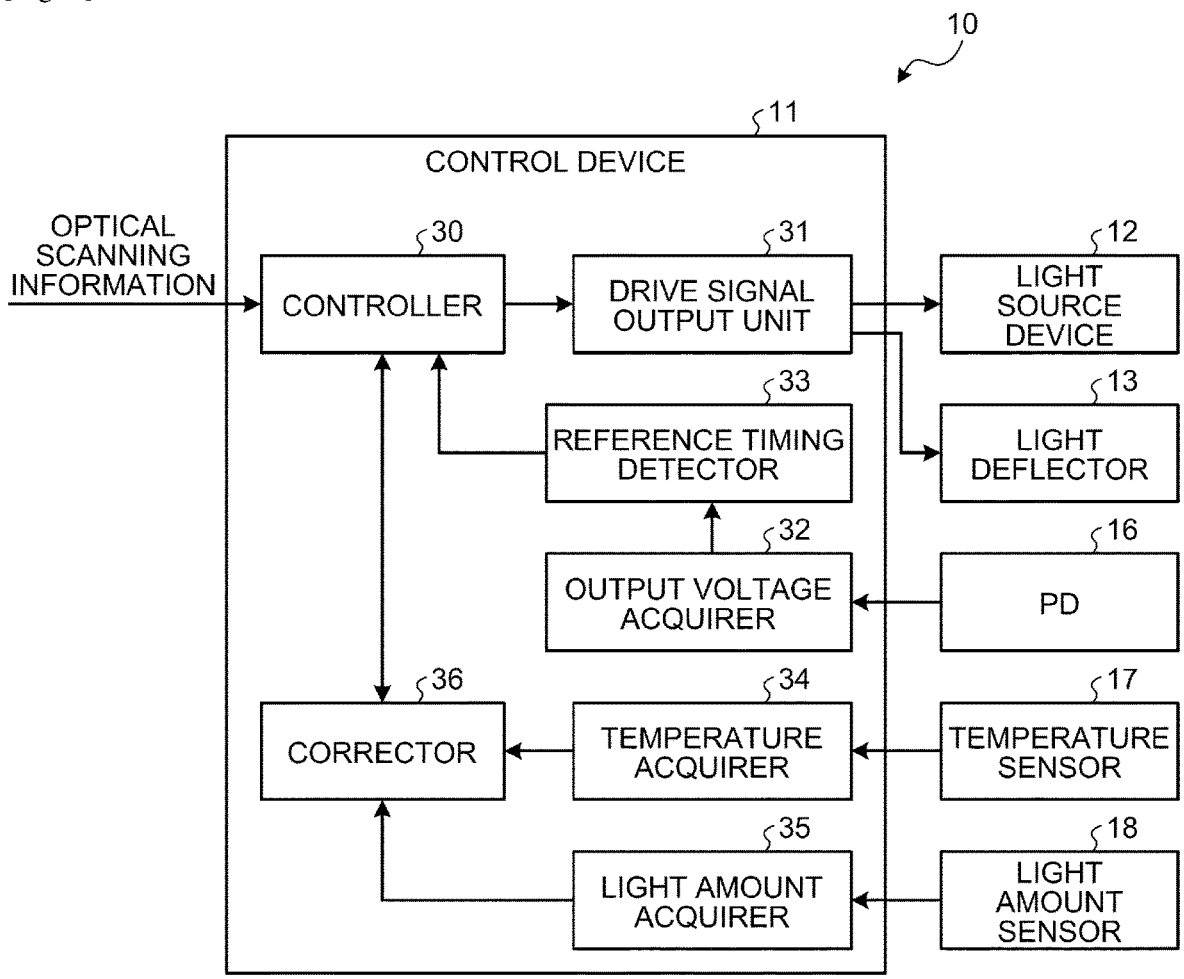
[Fig. 4]
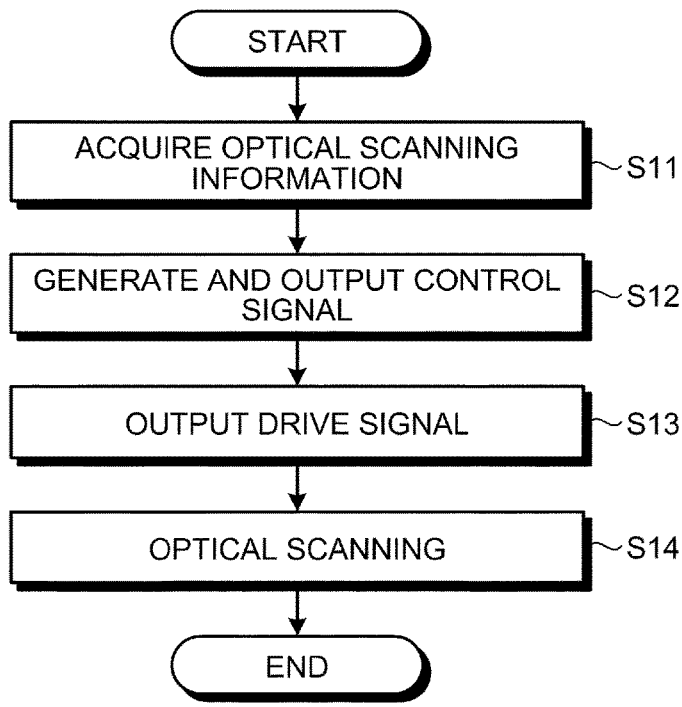

[Fig. 5]
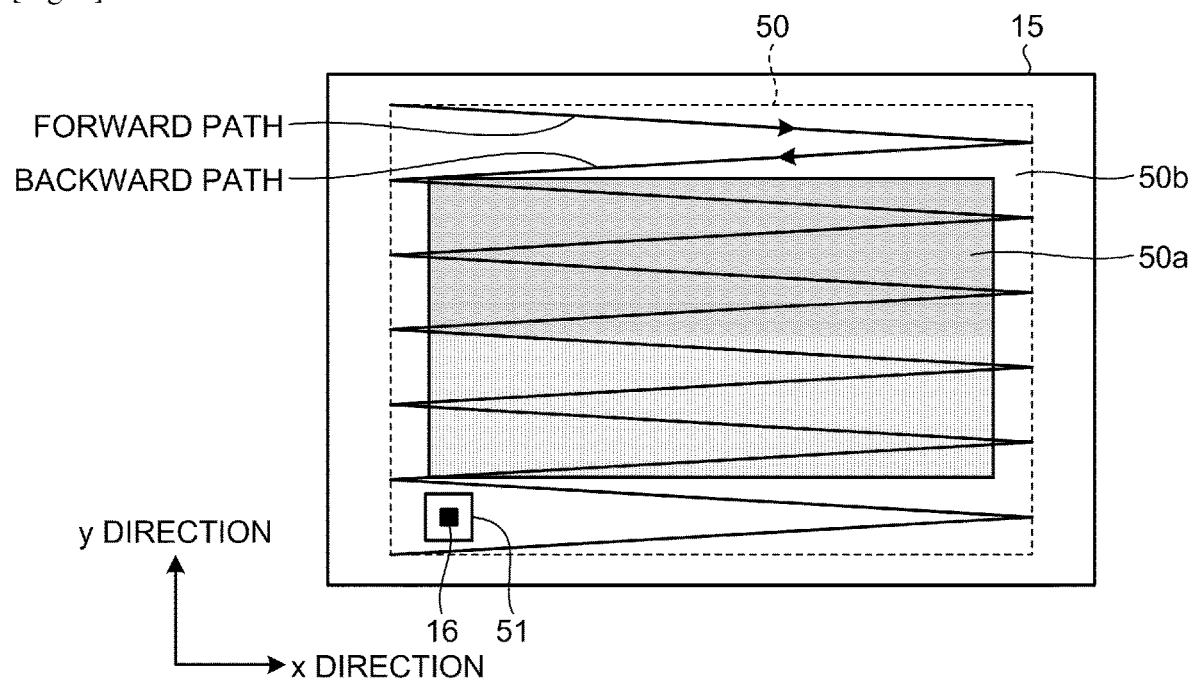
[Fig. 6]
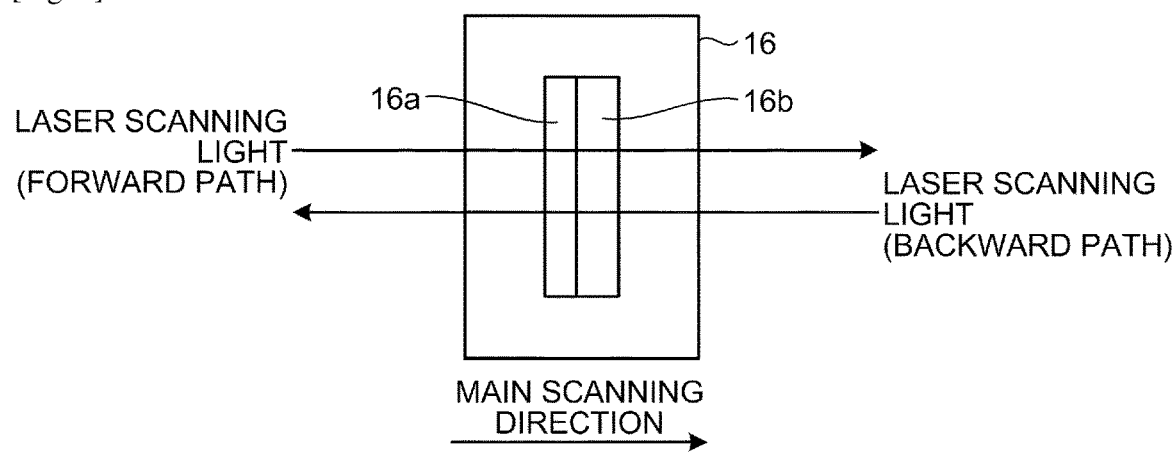

[Fig. 7]
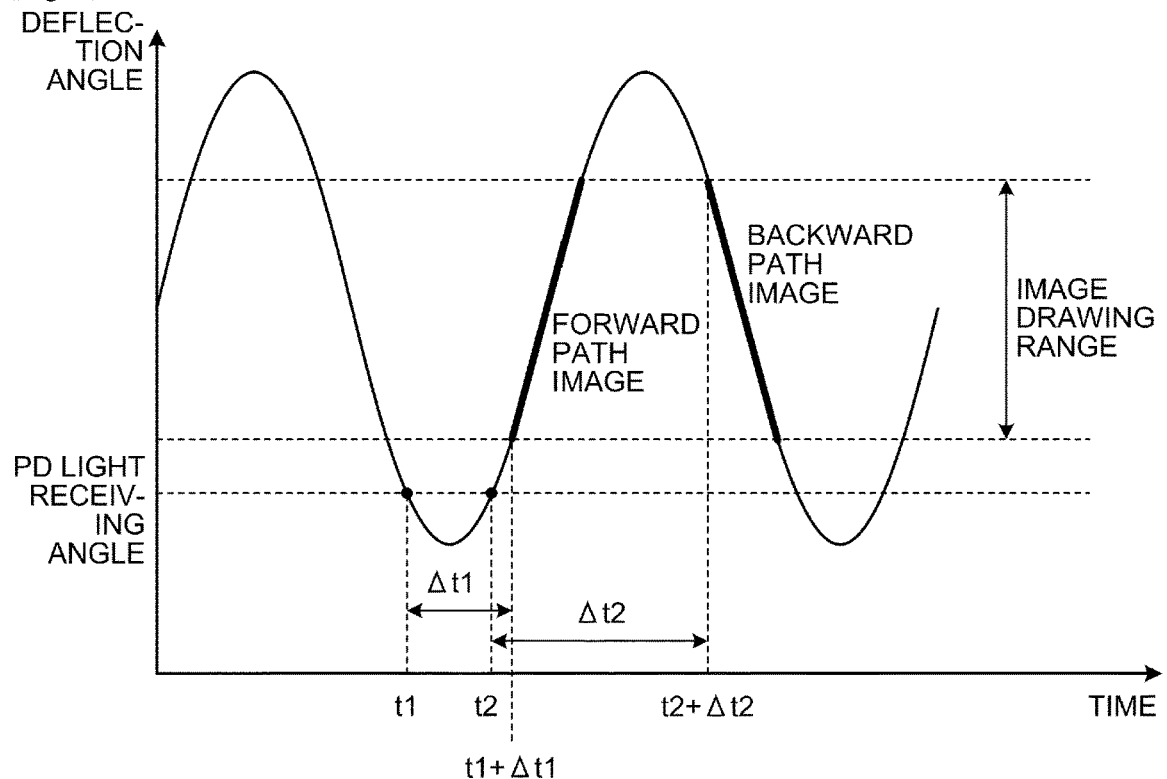
[Fig. 8]
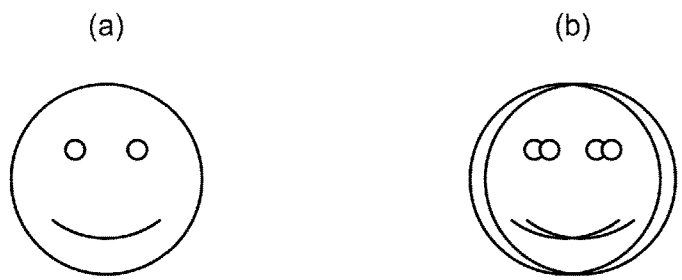
[Fig. 9]
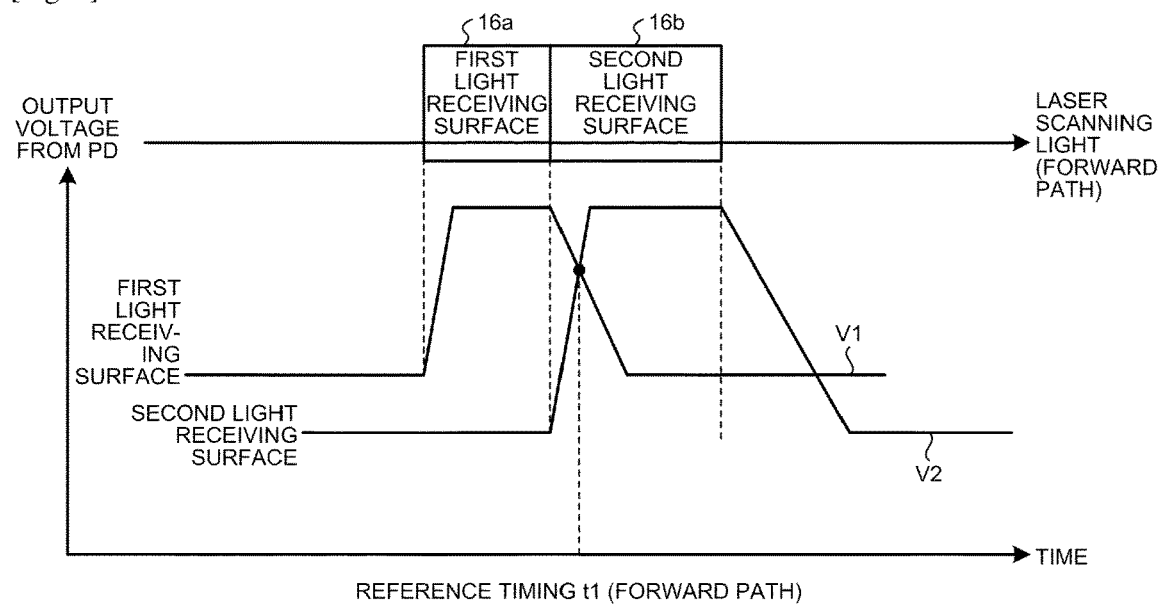

[Fig. 10]
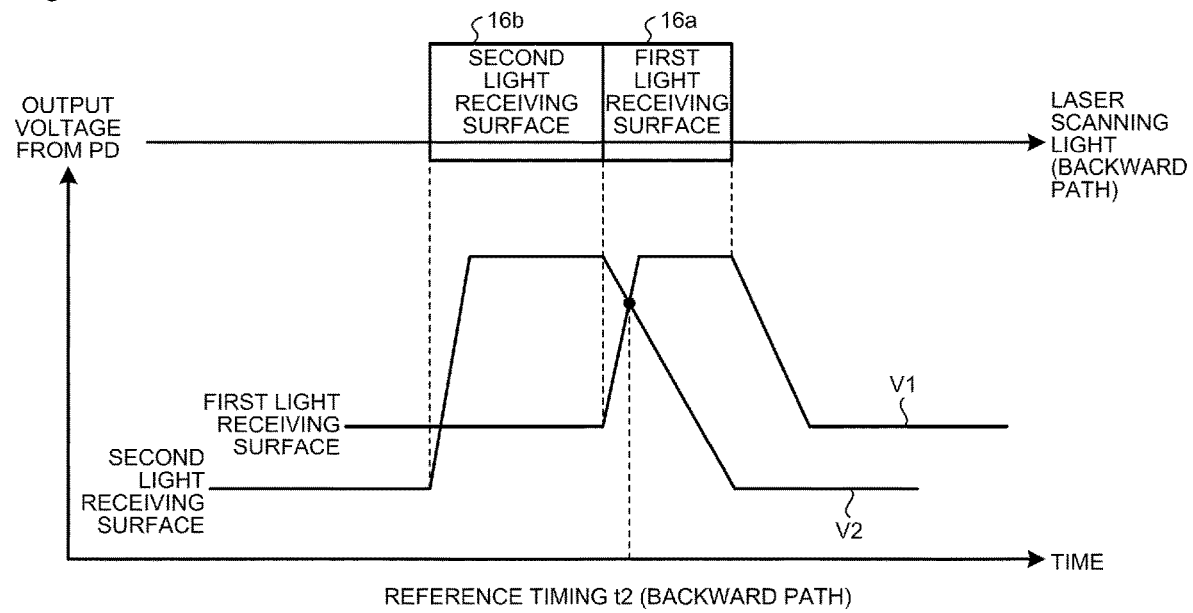
[Fig. 11A]
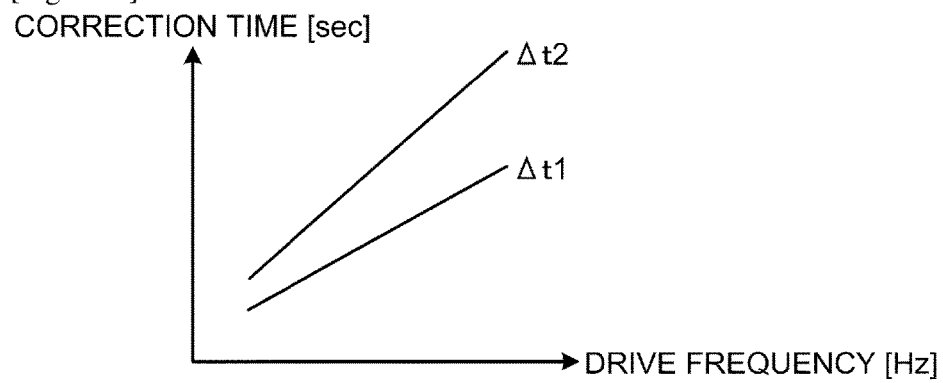
[Fig. 11B]
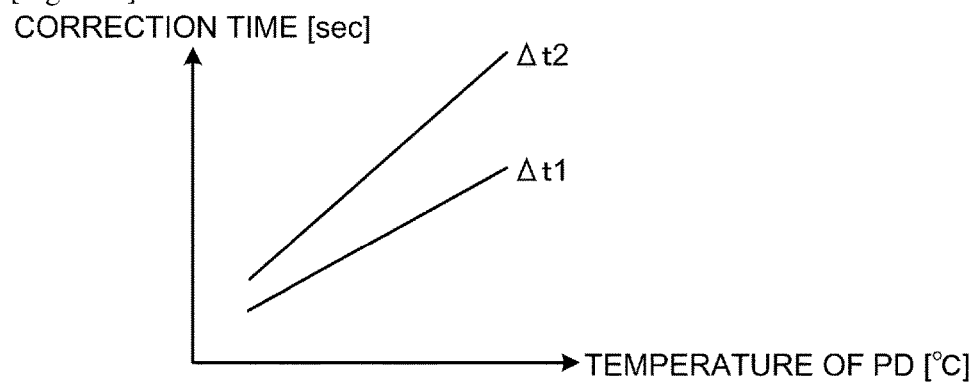

[Fig. 11C]
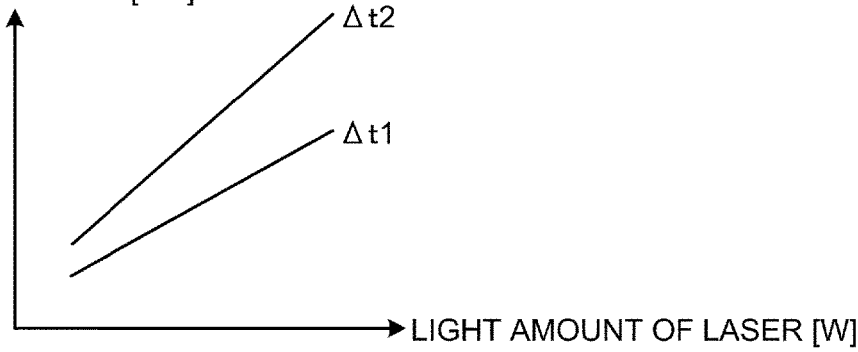
[Fig. 12]
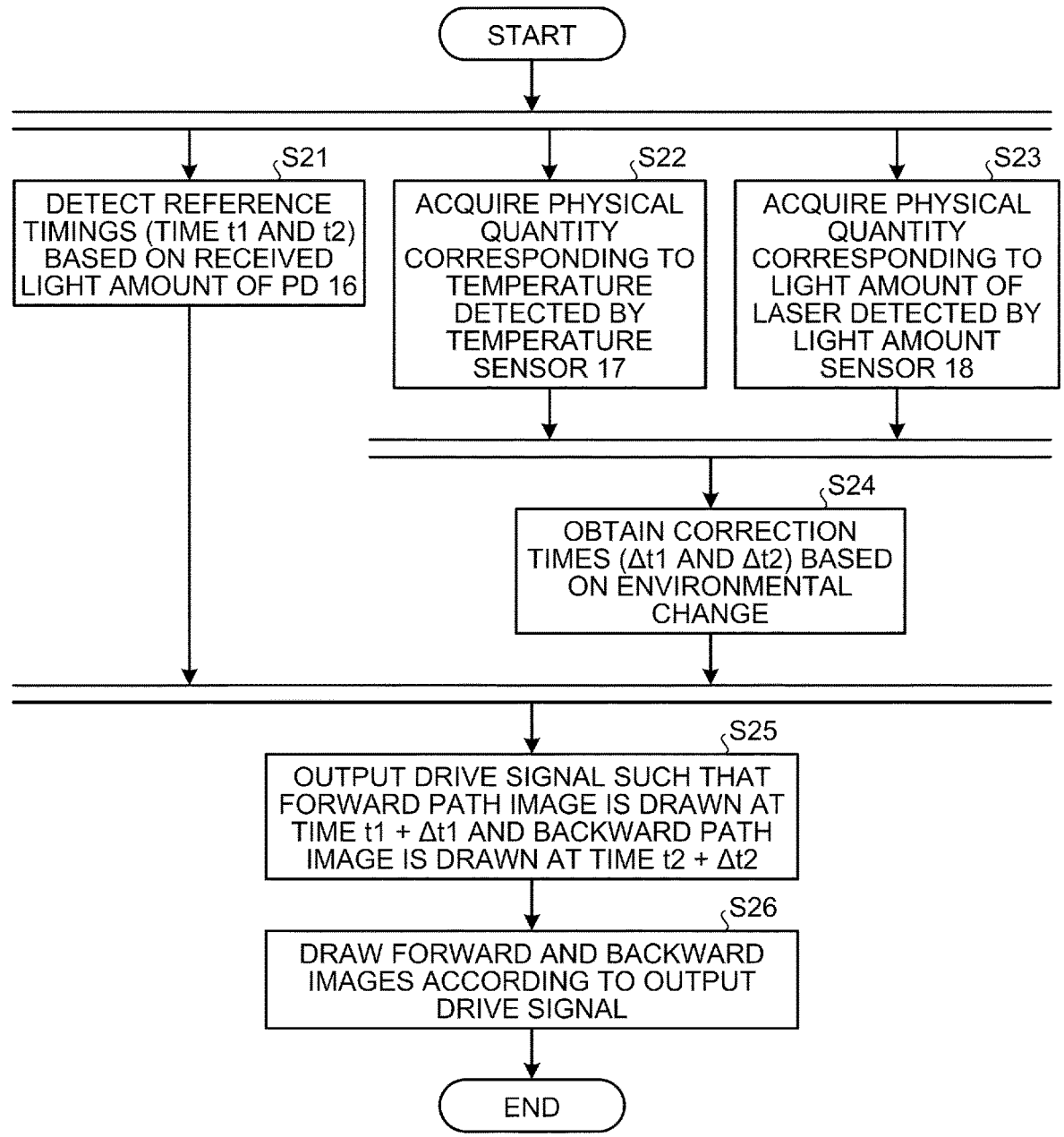

[Fig. 13]
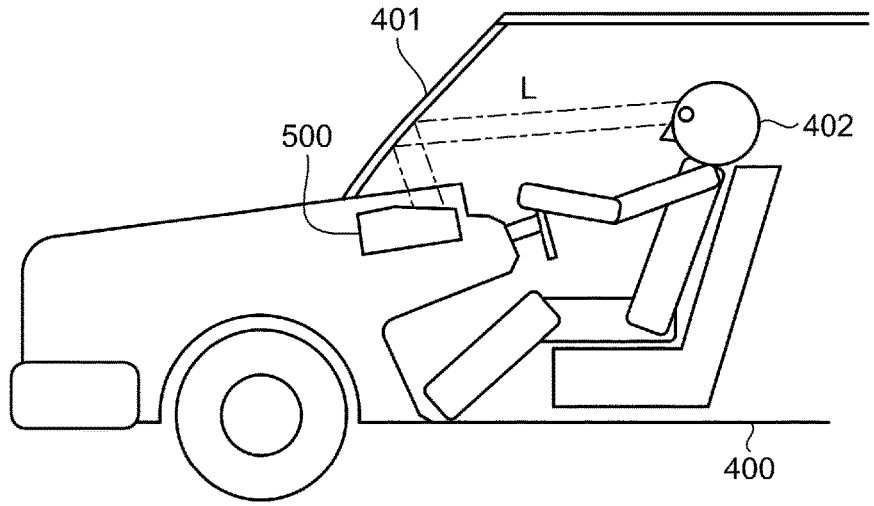
[Fig. 14]
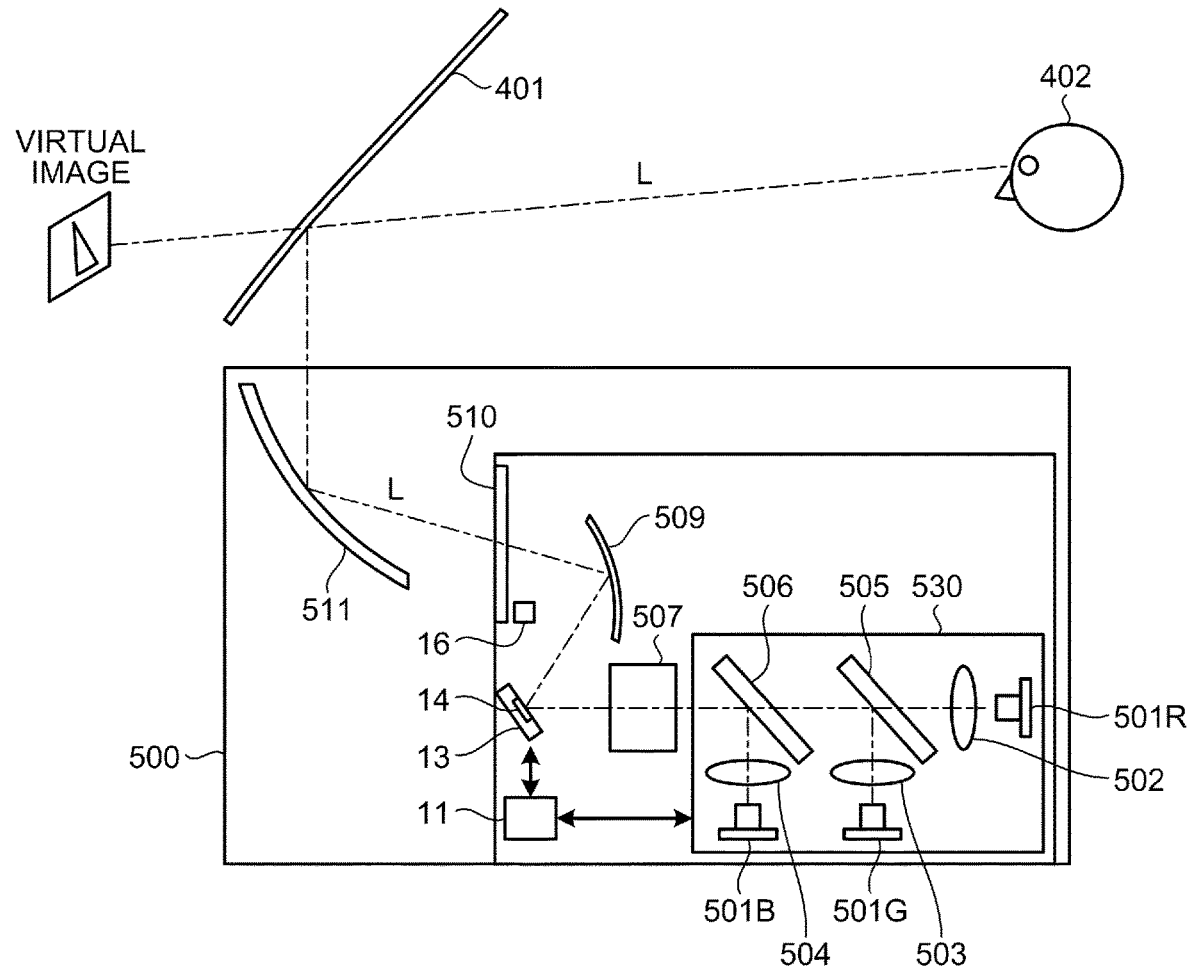

[Fig. 15]
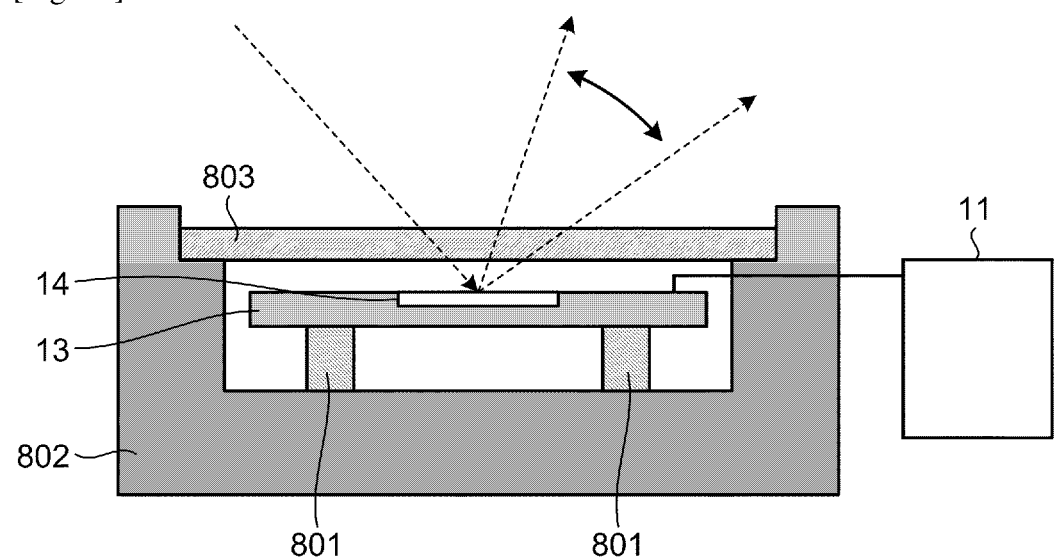

[Fig. 16]
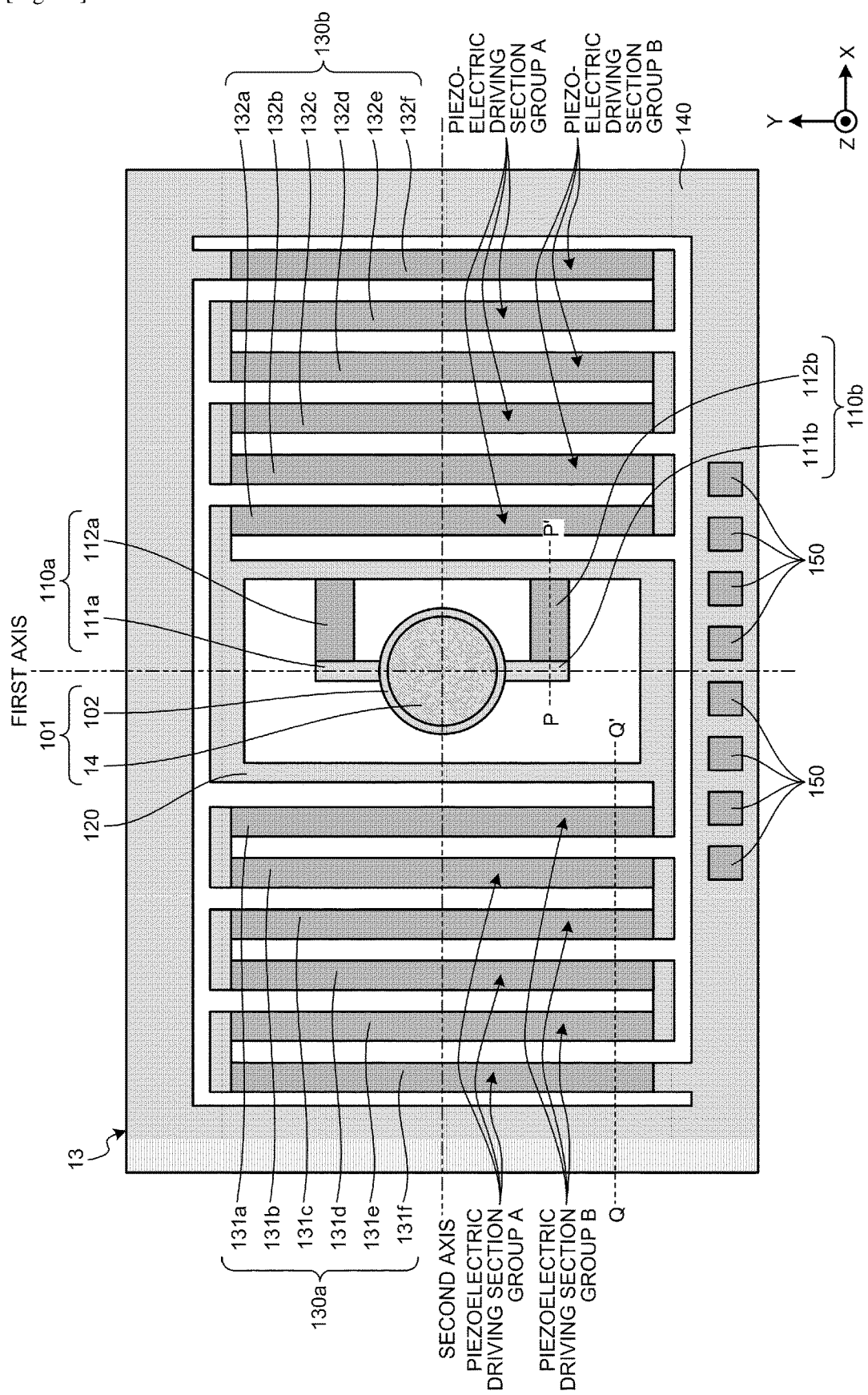

[Fig. 17]
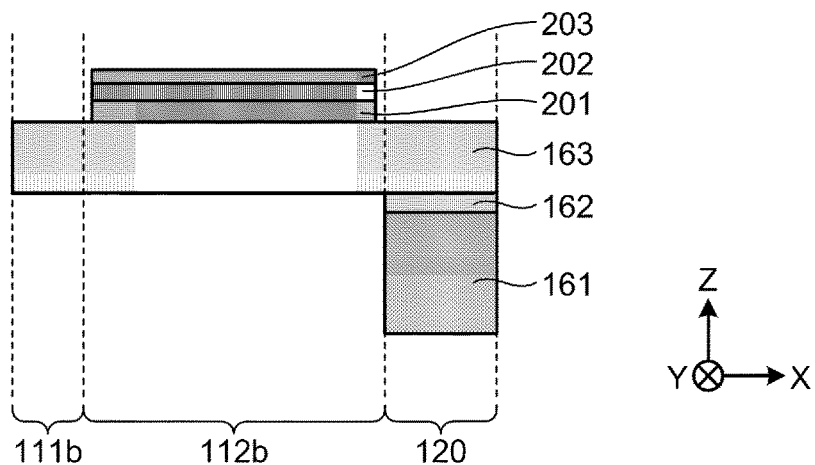
[Fig. 18]
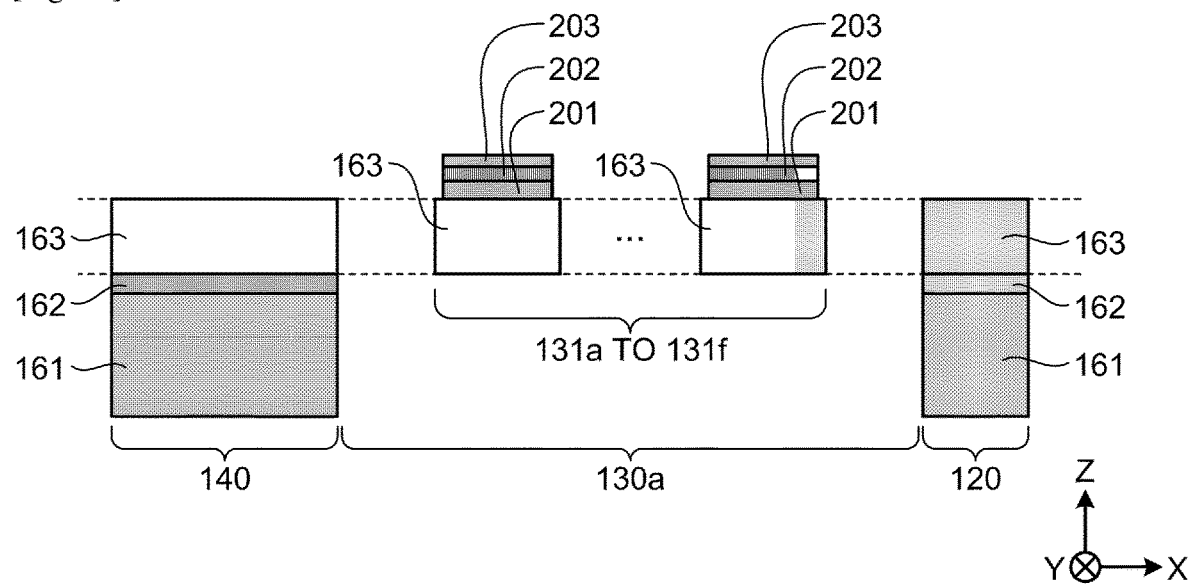

[Fig. 19]
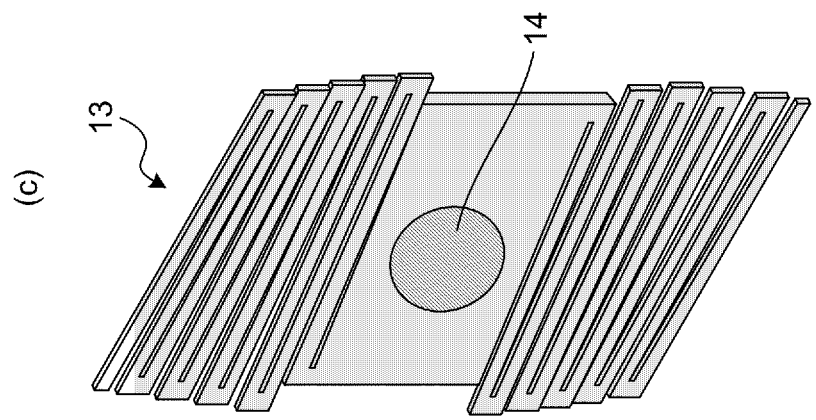
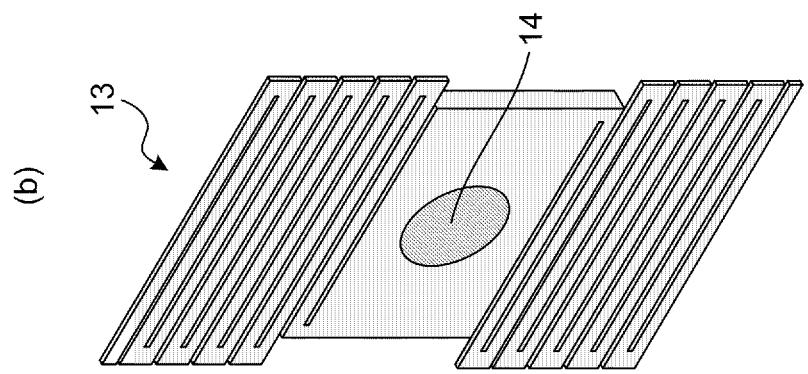
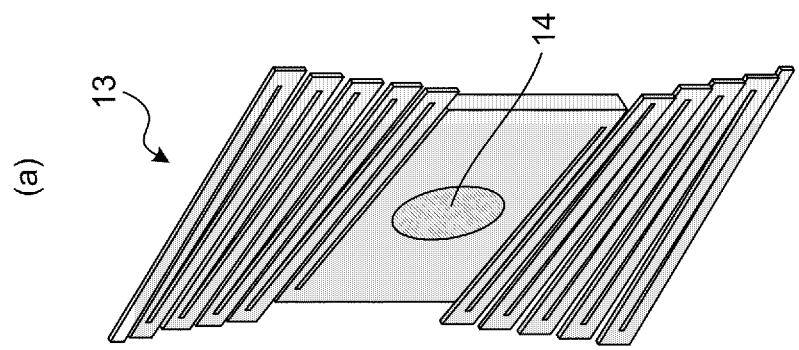

[Fig. 20]
(a)
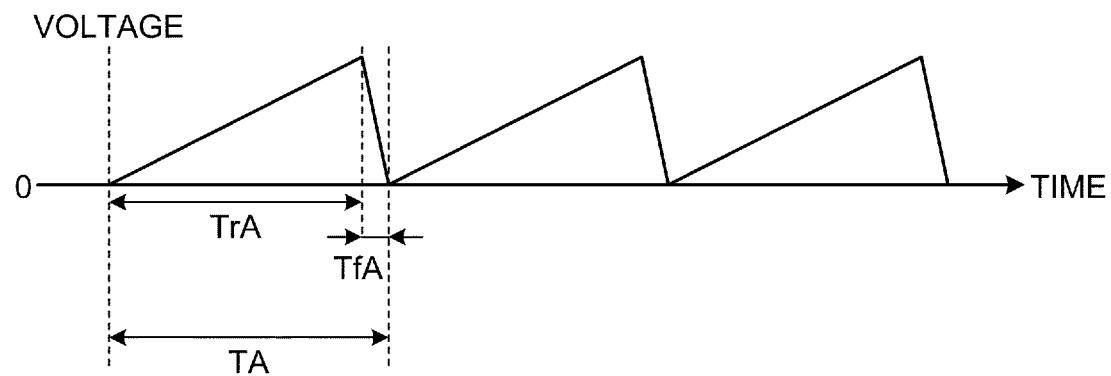
(b)
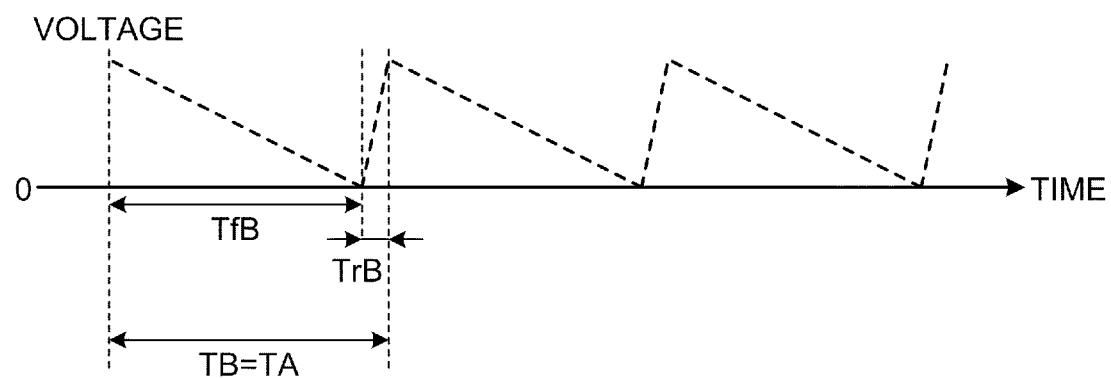
(c)
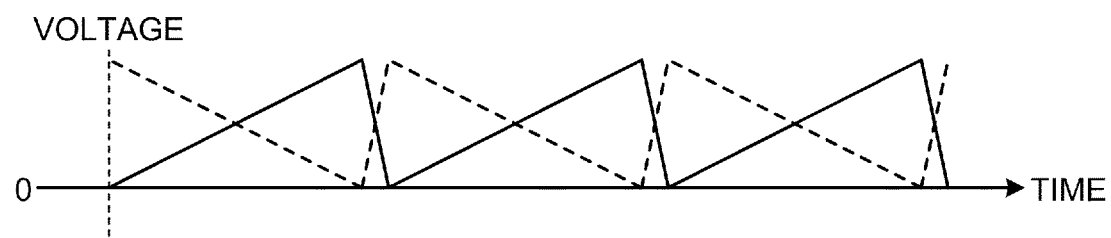

[Fig. 21]
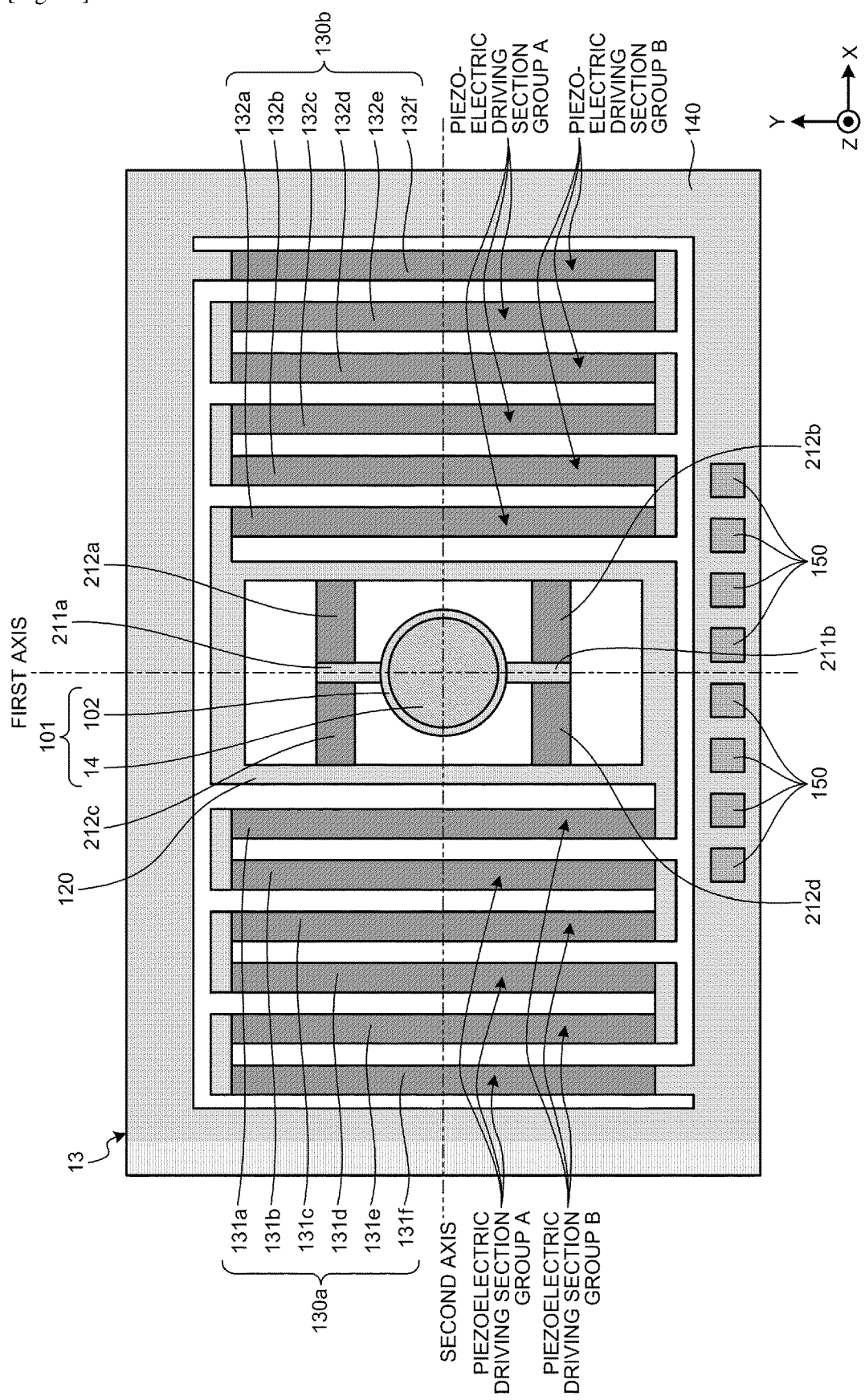

CONTROL DEVICE, IMAGE PROJECTION APPARATUS, AND CONTROL METHOD

TECHNICAL FIELD

The present invention relates to a control device, an image projection apparatus, and a control method.

BACKGROUND ART

In recent years, as a micro electro mechanical systems (MEMS) device using a micromachining technology for microfabrication of, for example, silicon and glass to which a semiconductor manufacturing technology is applied, a compact light deflection mirror in which a movable section provided with a reflecting surface on a substrate and an elastic beam section are integrally formed has been developed as means for deflecting and scanning a light beam. As such a light deflection mirror, there is a piezoelectric type light deflection mirror in which a thin piezoelectric material is superimposed on a beam-shaped elastic member of the mirror for driving to form a piezoelectric actuator. Furthermore, by adopting a configuration capable of two-dimensional optical scanning of horizontal scanning and vertical scanning, downsizing and cost reduction of a two-dimensional laser scanning apparatus can be realized.

Meanwhile, in an image projection apparatus serving as the two-dimensional laser scanning apparatus that forms an image on a screen by two-dimensionally scanning a light beam by rotation of a mirror, it is necessary to appropriately maintain the position and size of the image on the screen. In addition, when one image is formed on a forward path and a backward path of laser scanning, positions of images formed on the forward path and the backward path must coincide. Therefore, a technology is already known in which the position and size of the image is made constant by expanding a scanning range such that a light beam is received by a photodiode (PD) installed around an image drawing area and controlling a mirror rotation angle and a light emission timing on the basis of a light receiving timing of the PD.

As such a technology for matching forward and backward images using the light receiving timing of the PD, a technology has been suggested in which a shift between the forward and backward images is eliminated using a plurality of PDs through correction of a reference timing and a light emission start timing using a PD different from a PD that sets the reference timing (refer to Patent Literature 1).

SUMMARY OF INVENTION

Technical Problem

However, in the technology disclosed in Patent Literature 1, since the plurality of PDs is installed in order to correct a shift between the forward and backward images, an optical layout for installing a plurality of PDs is required, causing a problem that the volume of an optical engine part of the image projection apparatus increases.

The present invention has been made in view of the above and it is an object of the present invention to provide a control device, an image projection apparatus, and a control method capable of suppressing a shift between forward and backward images using a single PD.

Solution to Problem

According to one aspect of the present invention, a control device includes an acquirer, a timing detector, a controller, and a driver. The acquirer is configured to acquire an output voltage output from a light detector having a light receiving surface on which laser light scanned by a light source device and a light deflector is received. The timing detector is configured to separately detect reference timings of the laser light on forward and backward paths in a scanning direction based on the output voltage corresponding to the light receiving surface acquired by the acquirer. The controller is configured to generate a control signal for causing the light source device and the light deflector to draw a forward path image on a surface to be scanned from time obtained by adding a first correction time to the reference timing on the forward path and to draw a backward path image on the surface to be scanned from time obtained by adding a second correction time to the reference timing on the backward path. The driver is configured to draw the forward path image and the backward path image by driving the light deflector to scan the laser light and driving an irradiation action of the light source device in synchronization with the action of the scanning of the laser light, based on the control signal.

Advantageous Effects of Invention

According to the present invention, a shift between forward and backward images can be suppressed using a single PD.

BRIEF DESCRIPTION OF DRAWINGS

FIG. 1 is a schematic diagram of an example of an optical scanning system.

FIG. 2 is a hardware configuration diagram of an example of the optical scanning system.

FIG. 3 is a functional block diagram of an example of a control device.

FIG. 4 is a flowchart of an example of processing according to the optical scanning system.

FIG. 5 is a diagram for explaining a laser scanning action of the optical scanning system.

FIG. 6 is a diagram for explaining a configuration of a PD of the optical scanning system and forward and backward scanning light of a laser.

FIG. 7 is a diagram for explaining deflection angles on a reflecting surface and projection timings of a forward path image and a backward path image in the case of scanning in a main scanning direction.

FIG. 8 is a diagram for explaining a shift between forward and backward images.

FIG. 9 is a graph illustrating an example of an output voltage in a case where the PD receives laser scanning light on a forward path.

FIG. 10 is a graph illustrating an example of an output voltage in a case where the PD receives laser scanning light on a backward path.

FIG. 11A is a graph illustrating an example of a correction time that is varied depending on an environmental change (drive frequency).

FIG. 11B is a graph illustrating an example of the correction time that is varied depending on an environmental change (temperature).

FIG. 11C is a graph illustrating an example of the correction time that is varied depending on an environmental change (laser light amount).

FIG. 12 is a flowchart illustrating an example of a correction action of the optical scanning system for the forward and backward images.

FIG. 13 is a schematic diagram of an example of an automobile equipped with a head-up display apparatus.

FIG. 14 is a schematic diagram of an example of the head-up display apparatus.

FIG. 15 is a schematic diagram of an example of a packaged light deflector.

FIG. 16 is a plan view of an example of the light deflector as viewed from a +Z direction.

FIG. 17 is a cross-sectional view of the light deflector illustrated in FIG. 16 taken along line P-P'.

FIG. 18 is a cross-sectional view of the light deflector illustrated in FIG. 16 taken along line Q-Q'.

FIG. 19 is a view schematically expressing deformation of a second driving section of the light deflector.

FIG. 20 illustrate graphs: (a) is a graph illustrating an example of a waveform of a drive voltage A applied to a piezoelectric driving section group A of the light deflector, (b) is a graph illustrating an example a waveform of a drive voltage B applied to a piezoelectric driving section group B of the light deflector, and (c) is a graph illustrating an example obtained by superimposing the waveform of the drive voltage in (a) and the waveform of the drive voltage in (b).

FIG. 21 is a plan view of a light deflector according to a modification as viewed from the +Z direction.

DESCRIPTION OF EMBODIMENTS

Hereinafter, embodiments of the present invention will be described in detail.

Optical Scanning System

First, an optical scanning system to which a control device according to an embodiment of the present invention is applied will be described in detail with reference to FIGS. 1 to 4.

FIG. 1 illustrates a schematic diagram of an example of the optical scanning system. As illustrated in FIG. 1, the optical scanning system 10 is a system that deflects light emitted from a light source device 12 on a reflecting surface 14 included in a light deflector 13 and optically scans a surface to be scanned 15 under the control of the control device 11. The optical scanning system 10 includes the control device 11, the light source device 12, the light deflector 13 having the reflecting surface 14, a PD 16 (light detector), a temperature sensor 17, and a light amount sensor 18.

The control device 11 is an electronic circuit unit including, for example, a central processing unit (CPU) and a field-programmable gate array (FPGA).

The light deflector 13 is, for example, a MEMS device having the reflecting surface 14 and capable of moving the reflecting surface 14.

The light source device 12 is, for example, a laser device that irradiates the surface to be scanned 15 with a laser. In addition, the surface to be scanned 15 is, for example, a screen.

The PD 16 is a photodiode that detects reception of light of a laser scanned by the light source device 12. The PD 16 outputs a voltage corresponding to a received light amount of the laser.

The temperature sensor 17 is a sensor installed in the vicinity of the PD 16 in order to detect the temperature of the PD 16. The light amount sensor 18 is a sensor that detects the light amount (light intensity) of the laser emitted from the light source device 12.

The control device 11 generates control commands for the light source device 12 and the light deflector 13 on the basis of acquired optical scanning information and outputs drive signals to the light source device 12 and the light deflector 13 on the basis of the control commands. The light source device 12 emits light from a light source on the basis of the input drive signal. The light deflector 13 rotates the reflecting surface 14 around at least one of a first axis and a second axis on the basis of the input drive signal. As a result, for example, under the control of the control device 11 based on image information which is an example of the optical scanning information, an arbitrary image can be projected on the surface to be scanned 15 by rotating the reflecting surface 14 of the light deflector 13 individually around the two axes in a predetermined range and deflecting irradiation light from the light source device 12 incident on the reflecting surface 14 to optically scan. Note that the details of the light deflector 13 and the control by the control device 11 of the present embodiment will be described later.

Next, a hardware configuration of an example of the optical scanning system 10 will be described with reference to FIG. 2. FIG. 2 is a hardware configuration diagram of an example of the optical scanning system 10. As illustrated in FIG. 2, the optical scanning system 10 includes the control device 11, the light source device 12, the light deflector 13, the PD 16, the temperature sensor 17, and the light amount sensor 18, which are electrically connected to each other.

Control Device

The control device 11 as one of these members includes a CPU 20, a random access memory 21 (RAM), a read only memory 22 (ROM), an FPGA 23, an external I/F 24, a light source device driver 25, a light deflector driver 26, a first sensor I/F 27, a second sensor I/F 28, and a third sensor I/F 29.

The CPU 20 is an arithmetic device that reads programs and data from a storage device such as the ROM 22 onto the RAM 21 and executes processing to realize overall control and functions of the control device 11. The RAM 21 is a volatile storage device that temporarily holds programs and data. The ROM 22 is a nonvolatile storage device capable of storing programs and data even when the power is turned off and stores a processing program and data executed by the CPU 20 to control each function of the optical scanning system 10.

The FPGA 23 is a circuit that outputs control signals suitable for the light source device driver 25 and the light deflector driver 26 in accordance with processing by the CPU 20.

The external I/F 24 is, for example, an interface with an external device, a network, and so on. The external device includes, for example, a host device such as a personal computer (PC) and a storage device such as a USB memory, an SD card, a CD, a DVD, an HDD, or an SSD. Meanwhile, the network is, for example, a controller area network (CAN) of an automobile, a local area network (LAN), the Internet, or the like. The external I/F 24 is only required to have a configuration allowing connection or communication with an external device and may be prepared for each external device.

The light source device driver 25 is an electric circuit that outputs a drive signal such as a drive voltage to the light source device 12 in accordance with the input control signal. The light deflector driver 26 is an electric circuit that outputs a drive signal such as a drive voltage to the light deflector 13 in accordance with the input control signal.

The first sensor I/F 27 is an interface for connecting the PD 16. The first sensor I/F 27 receives a voltage output from the PD 16 when the PD 16 detects reception of light of the laser.

The second sensor I/F 28 is an interface for connecting the temperature sensor 17. The second sensor I/F 28 receives a physical quantity (for example, current or voltage) corresponding to a temperature detected by the temperature sensor 17.

The third sensor I/F 29 is an interface for connecting the light amount sensor 18. The third sensor I/F 29 receives a physical quantity (for example, current or voltage) corresponding to a light amount of the laser from the light source device 12 detected by the light amount sensor 18.

In the control device 11, the CPU 20 acquires the optical scanning information from an external device or a network via the external I/F 24. Note that any configuration may be adopted as long as the CPU 20 can acquire the optical scanning information. The optical scanning information may be saved and kept in the ROM 22 or the FPGA 23 within the control device 11, or alternatively, a storage device such as an SSD may be newly provided within the control device 11 such that the optical scanning information is saved and kept in this storage device. Here, the optical scanning information is information indicating how optical scanning is performed on the surface to be scanned 15. For example, in the case of displaying an image by optical scanning, the optical scanning information is image data. Meanwhile, for example, in the case of optical writing by optical scanning, the optical scanning information is write data indicating a writing order or a writing place. Besides, for example, in the case of object recognition by optical scanning, the optical scanning information is irradiation data indicating a timing and an irradiation range at which light for object recognition is emitted. The control device 11 according to the present embodiment can realize a functional configuration to be described next using a command from the CPU 20 and the hardware configuration illustrated in FIG. 2.

Functional Configuration of Control Device

Next, the functional configuration of the control device 11 of the optical scanning system 10 will be described with reference to FIG. 3. FIG. 3 is a functional block diagram of an example of the control device of the optical scanning system. As illustrated in FIG. 3, the control device 11 has, as functions, a controller 30, a drive signal output unit 31 (driver), an output voltage acquirer 32, a reference timing detector 33, a temperature acquirer 34, a light amount acquirer 35, and a corrector 36.

The controller 30, which is realized by, for example, the CPU 20 and the FPGA 23, acquires the optical scanning information from an external device and converts the optical scanning information into the control signal to output to the drive signal output unit 31. For example, the controller 30 constitutes a control unit so as to acquire image data from an external device or the like as the optical scanning information and generate the control signal from the image data through predetermined processing to output to the drive signal output unit 31.

The drive signal output unit 31 constitutes a signal applying unit, which is realized by, for example, the light source device driver 25 and the light deflector driver 26, and outputs a drive signal to the light source device 12 or the light deflector 13 on the basis of the input control signal. The drive signal output unit 31 may be provided, for example, for each object to which the drive signal is output. The drive signal is a signal for controlling the driving of the light source device 12 or the light deflector 13. For example, the drive signal for the light source device 12 is a drive voltage that controls an irradiation timing and irradiation intensity of the light source. Meanwhile, for example, the drive signal for the light deflector 13 is a drive voltage that controls a timing and a movable range of rotation of the reflecting surface 14 included in the light deflector 13. The control device 11 may acquire the irradiation timing and the light receiving timing of the light source from an external device such as the light source device 12 or a light receiving device and synchronize these timings with the driving of the light deflector 13.

The output voltage acquirer 32 is realized by, for example, the first sensor I/F 27, the CPU 20, and the FPGA 23 and, when reception of light of the laser emitted from the light source device 12 is detected by the PD 16, acquires the output voltage output in accordance with this received light amount.

The reference timing detector 33 is realized by, for example, the CPU 20 and the FPGA 23 and detects the reference timing, which is a timing at which light of the laser is received by the PD 16, on the basis of the output voltage from the PD 16 acquired by the output voltage acquirer 32. How to set the reference timing will be described later with reference to FIGS. 9 and 10.

The temperature acquirer 34 is realized by, for example, the second sensor I/F 28, the CPU 20, and the FPGA 23 and acquires a physical quantity (for example, current or voltage) corresponding to the temperature of the PD 16 detected by the temperature sensor 17.

The light amount acquirer 35 is realized by, for example, the third sensor I/F 29, the CPU 20, and the FPGA 23 and acquires a physical quantity (for example, current or voltage) corresponding to the light amount of the laser from the light source device 12 detected by the light amount sensor 18.

When the reference timing detected by the reference timing detector 33 is varied due to environmental changes, the corrector 36 varies the correction time with respect to the reference timing in accordance with the environmental changes (for example, variations of a resonance frequency of the light deflector 13, the temperature of the PD 16, and the light amount of the laser emitted by the light source device 12). A method for varying the correction time by the corrector 36 will be described later with reference to FIGS. 11A to 11C.

Note that functions of the controller 30, the drive signal output unit 31, the output voltage acquirer 32, the reference timing detector 33, the temperature acquirer 34, the light amount acquirer 35, and the corrector 36 of the control device 11 illustrated in FIG. 3 are represented conceptually and not limited to such a configuration. For example, a plurality of functional units illustrated as independent functional units in the control device 11 illustrated in FIG. 3 may be configured as one functional unit. On the other hand, a function included in one functional unit in the control device 11 illustrated in FIG. 3 may be divided into a plurality of functions and configured as a plurality of functional units.

Optical Scanning Processing

Next, processing (optical scanning processing) in which the optical scanning system 10 optically scans the surface to be scanned 15 will be described with reference to FIG. 4. FIG. 4 is a flowchart of an example of processing according to the optical scanning system.

In step S11, the controller 30 acquires the optical scanning information from an external device or the like. In step S12, the controller 30 generates a control signal from the acquired optical scanning information and outputs the control signal to the drive signal output unit 31. In addition, the controller 30 generates the control signal on the basis of the reference timing of the PD 16 detected by the reference timing detector 33 and the correction time obtained by the corrector 36.

In step S13, the drive signal output unit 31 outputs the drive signal to the light source device 12 and the light deflector 13 on the basis of the input control signal. In step S14, the light source device 12 emits light on the basis of the input drive signal. In addition, the light deflector 13 rotationally drives the reflecting surface 14 on the basis of the input drive signal. Through the driving of the light source device 12 and the light deflector 13, light is deflected in an arbitrary direction and is optically scanned.

Note that, in the above-described optical scanning system 10, one control device 11 includes a device and a function for controlling the light source device 12 and the light deflector 13, but a control device for the light source device and a control device for the light deflector may be provided separately.

Additionally, in the optical scanning system 10, one control device 11 is provided with the functions of the controller 30 for the light source device 12 and the light deflector 13 and the function of the drive signal output unit 31, but these functions may be separately provided. For example, a configuration provided with a drive signal output device including the drive signal output unit 31 provided separately from the control device 11 including the controller 30 may be adopted. In addition, an optical deflection system that performs optical deflection may be constituted by the light deflector 13 having the reflecting surface 14 and the control device 11 from among the optical scanning system 10.

Next, a specific action in which the optical scanning system 10 optically scans the surface to be scanned 15 will be described with reference to FIG. 5. FIG. 5 is a diagram for explaining a laser scanning action of the optical scanning system. In the optical scanning system 10, the control device 11 controls laser scanning by the light source device 12 and the light deflector 13 according to a timing (reference timing) of the laser detected by the PD 16. As illustrated in FIG. 5, for example, laser scanning by the optical scanning system 10 is implemented by alternately repeating laser scanning on the forward path from the left to the right as viewed in the plane of the page of FIG. 5 and laser scanning on the backward path from the right to the left, while a scanning position is shifted downwardly from an upper side. As illustrated in FIG. 5, a scanning area 50 scanned by the optical scanning system 10 with the laser on the surface to be scanned 15 is divided into a drawing area 50a and a non-drawing area 50b. The PD 16 is installed in the non-drawing area 50b. The optical scanning system 10 emits the laser to form a light receiving image 51 only on a portion where the PD 16 is installed such that unnecessary light does not appear in the non-drawing area 50b as image noise. The laser scanning action by the optical scanning system 10 is equivalent to a deflection angle of the reflecting surface 14 of the light deflector 13. The optical scanning system 10 uses the reference timing at which reception of light of the laser is detected by the PD 16, as a reference to control a light emission timing of the laser by the light source device 12, thereby forming (projecting) a fine image on the surface to be scanned 15 which is a screen or the like.

Note that, in a case where the light source device 12 serving as a light source is configured to emit lasers of a plurality of colors, it is preferable that the light receiving image 51 to be formed on a portion where the PD 16 is installed be an image that can be depicted with a laser of a color on the shortest wavelength side. For example, when the light source device 12 is an RGB laser light source, the light receiving image 51 is preferably an image depicted only by blue (B). This makes it difficult for the user to visually recognize unnecessary light due to, for example, irregular reflection caused by the irradiation of the laser on the PD 16 because it is difficult for the user to visually recognize light on the short wavelength side.

Reference Timing for Image Projection

Next, a configuration and an action of the PD 16 of the optical scanning system 10 and a detection method for the reference timing will be described with reference to FIGS. 6 to 10.

First, a configuration of the PD 16 and a detection action for laser scanning light will be described with reference to FIG. 6. FIG. 6 is a diagram for explaining a configuration of the PD of the optical scanning system and forward and backward scanning light of the laser. FIG. 6 illustrates a front view of the PD 16. A direction in which laser light from the light source device 12, which has been reflected from the light deflector 13, is scanned in a horizontal direction of the surface to be scanned 15 is defined as a main scanning direction, where the case of scanning from the left to the right is defined as the forward path and the case of scanning from the right to the left is defined as the backward path. Hereinafter, the laser light scanned along the main scanning direction is referred to as "laser scanning light" in some cases. As illustrated in FIG. 6, a light receiving surface of the PD 16 is divided into two, where a light receiving surface on the left side as viewed in the plane of the page of FIG. 6 is set as a first light receiving surface 16a and a light receiving surface on the right side is set as a second light receiving surface 16b. As illustrated in FIG. 6, the area of the second light receiving surface 16b is configured so as to be larger than the area of the first light receiving surface 16a.

When the laser scanning light is scanned on the forward path, the laser scanning light is first detected by the first light receiving surface 16a and then detected by the second light receiving surface 16b. On the other hand, when the laser scanning light is scanned on the backward path, the laser scanning light is first detected by the second light receiving surface 16b and then detected by the first light receiving surface 16a. The direction of the laser scanning light can be discriminated by configuring such that the light receiving surface is divided into two and the areas of the first light receiving surface 16a and the second light receiving surface 16b are made different from each other, as in the PD 16 described above. It is thus not necessary to arrange a plurality of PDs and it is possible to eliminate a shift between forward and backward images projected individually on the forward and backward paths, using a single PD (PD 16). Furthermore, since it is sufficient to provide a single PD, it is also not necessary to configure an optical layout for installing a plurality of PDs and it is possible to downsize an image projection apparatus or the like equipped with the optical scanning system 10.

Next, the reference timing of the PD 16 and drawing (projection) timings of the forward and backward images will be described with reference to FIGS. 7 and 8. FIG. 7 is a diagram for explaining the deflection angles on the reflecting surface and the projection timings of a forward path image and a backward path image in the case of scanning in the main scanning direction. FIG. 8 is a diagram for explaining a shift between the forward and backward images.

The graph illustrated in FIG. 7 is a graph illustrating deflection angles in the main scanning direction with respect to a driving time of the light deflector 13. As will be described later, the light deflector 13 sinusoidally drives the reflecting surface 14 in the main scanning direction with resonance vibration, whereby the laser scanning light is scanned back and forth in the main scanning direction on the surface to be scanned 15 which is a screen or the like. The time of a timing (reference timing) at which the laser scanning light takes a deflection angle (PD light receiving angle) at which the laser scanning light passes through the PD 16 on the forward path (to be detected) is defined as t1, whereas the time of a timing (reference timing) at which the laser scanning light takes a deflection angle (PD light receiving angle) at which the laser scanning light passes through the PD 16 on the backward path (to be detected) is defined as t2. A time from the reference timing at which the laser scanning light is detected by the PD 16 until an image (forward path image) is drawn (projected) on the forward path is defined as a forward path correction time $\Delta t1$ (first correction time), whereas a time from the reference timing at which the laser scanning light is detected by the PD 16 until an image (backward path image) is drawn (projected) on the backward path is defined as a backward path correction time $\Delta t2$ (second correction time). In this case, the time at which the drawing of the forward path image is started is represented as $t1+\Delta t1$ and the time at which the drawing of the backward path image is started is represented as $t2+\Delta t2$. In addition, respective initial values of the forward path correction time $\Delta t1$ and the backward path correction time $\Delta t2$ are stored in a storage apparatus such as the ROM 22 in advance.

As long as the forward path correction time $\Delta t1$ and the backward path correction time $\Delta t2$ are appropriately set with respect to the time t1 and t2 of the reference timings, the forward path image and the backward path image coincide in an image drawing range for the deflection angle illustrated in FIG. 7. In this case, as illustrated in (a) of FIG. 8, the drawing timings of the forward path image and the backward path image projected onto the surface to be scanned 15 coincide and the images overlap. In this manner, by superimposing the forward path image and the backward path image, projection can be performed with twice the luminance as when projection is performed only with one of them. On the other hand, (b) of FIG. 8 illustrates the forward path image and the backward path image when the drawing timings are shifted.

Next, the detection method for the reference timing by the PD 16 will be described with reference to FIGS. 9 and 10. FIG. 9 is a graph illustrating an example of the output voltage in a case where the PD receives the laser scanning light on the forward path. FIG. 10 is a graph illustrating an example of the output voltage in a case where the PD receives the laser scanning light on the backward path.

As illustrated in FIGS. 9 and 10, while the PD 16 does not detect the laser light, a difference is provided between bias voltages for the respective output voltages of the first light receiving surface 16a and the second light receiving surface 16b. That is, in a case where the output voltage corresponding to the first light receiving surface 16a is defined V1 (first output voltage) and the output voltage corresponding to the second light receiving surface 16b is defined V2 (second output voltage), which are acquired by the output voltage acquirer 32, a relationship between the bias voltages while both of the light receiving surfaces do not detect the laser light is set as V1>V2. By lowering the bias voltage of the second light receiving surface 16b in this manner such that a range (light receiving range) of the output voltage of the second light receiving surface 16b having a larger light receiving area than that of the first light receiving surface 16a can be widened, a margin for the influence of disturbance noise such as sunlight can be widened and the influence thereof can be suppressed.

In addition, assuming that the output voltages V1 and V2 are time-related values and represented as $V1(t)$ and $V2(t)$, respectively, the reference timing detector 33 detects the time t1 of the reference timing on the forward path as time at which $V1(t) \geq V2(t)$ is reversed to $V1(t) \leq V2(t)$. Meanwhile, the reference timing detector 33 detects the time t2 of the reference timing on the backward path as time at which $V1(t) \leq V2(t)$ is reversed to $V1(t) \geq V2(t)$. As described above, by defining the time at which the magnitude relationship between the respective output voltages of the first light receiving surface 16a and the second light receiving surface 16b is reversed as the reference timing, a shift in generation time between the reference timings on the forward path and the backward path can be made difficult to occur even when, for example, the light amount of the laser light varies and it is possible to improve the robustness against variations of the light amount.

Variation Processing for Correction Time With Respect to Reference Timing

Next, variation actions for the correction time when an environmental change occurs will be described with reference to FIGS. 11A to 11C. FIG. 11A is a graph illustrating an example of the correction time that is varied depending on an environmental change (drive frequency). FIG. 11B is a graph illustrating an example of the correction time that is varied depending on an environmental change (temperature). FIG. 11C is a graph illustrating an example of the correction time that is varied depending on an environmental change (laser light amount).

As described above, the respective initial values of the forward path correction time $\Delta t1$ and the backward path correction time $\Delta t2$ (hereinafter sometimes collectively referred to as "correction time") are stored in a storage apparatus such as the ROM 22 in advance. The sinusoidal driving of the reflecting surface 14 of the light deflector 13 in the main scanning direction has an inherent resonance frequency due to the weight of a movable section, the rigidity of a supporting beam section, and so on. Therefore, when the physical properties of a member change in accordance with a temperature change in the use environment of the light deflector 13, the resonance frequency of the reflecting surface 14 is shifted. Meanwhile, the performance of a piezoelectric thin film material of the light deflector 13 also has temperature dependency and thus, the resonance frequency is shifted in accordance with a temperature change in the use environment. In regard to the resonance vibration of the reflecting surface 14 in the main scanning direction, it is desirable that this resonance frequency of the resonance vibration be constant and constant laser light scanning be performed under the same driving condition in order to continuously project constant images. As described above, however, a shift of the resonance frequency appears due to variations in physical properties caused by the temperature and accordingly, it is necessary for the controller 30 and the drive signal output unit 31 to cause the drive frequency of the light deflector 13 to follow this shift of the resonance frequency in accordance therewith. However, when the drive frequency of the light deflector 13 is changed, the timings of detection of the laser light on the forward and backward paths by the PD 16, that is, the reference timings are relatively shifted. Therefore, as illustrated in FIG. 11A, the corrector 36 varies at least one of the forward path correction time $\Delta t1$ and the backward path correction time $\Delta t2$ on the basis of the changed drive frequency of the light deflector 13. As a result, a shift between the forward and backward images can be further suppressed.

In addition, a response speed of the PD 16 for the correction time changes depending on the temperature of the PD 16. Also in this case, since the reference timings on the forward and backward paths are relatively shifted, the corrector 36 varies at least one of the forward path correction time Δt1 and the backward path correction time Δt2 as illustrated in FIG. 11B, on the basis of the temperature (the temperature of the PD 16 itself or the temperature around the PD 16) detected by the temperature sensor 17 and then acquired by the temperature acquirer 34. As a result, a shift between the forward and backward images can be further suppressed.

Furthermore, in the correction time, the response speed of the PD 16 or the intensity distribution or the beam diameter of a laser profile with which the PD 16 is irradiated changes in accordance with the light amount of the laser emitted by the light source device 12. Also in this case, since the reference timings of the forward and backward paths are relatively shifted, the corrector 36 varies at least one of the forward path correction time Δt1 and the backward path correction time Δt2 as illustrated in FIG. 11C, on the basis of the light amount of the laser detected by the light amount sensor 18 and then acquired by the light amount acquirer 35. As a result, a shift between the forward and backward images can be further suppressed.

Note that variations of the correction time illustrated in FIGS. 11A to 11C are expressed as linear changes with respect to the drive frequency, the temperature of the PD 16, and the light amount of the laser light, respectively. However, an example of variations of the correction time is simply presented therein and variations of the correction time are not limited to this. It is sufficient to determine variations of the correction time in accordance with the characteristics of the optical scanning system 10.

Correction Action for Forward and Backward Images

Next, an action of correcting a shift between the forward and backward images by the optical scanning system 10 will be described with reference to FIG. 12. FIG. 12 is a flowchart illustrating an example of a correction action of the optical scanning system for the forward and backward images.

In step S21, the output voltage acquirer 32 acquires an output voltage output in accordance with the received light amount of the laser emitted from the light source device 12 and then received by the PD 16. Subsequently, the reference timing detector 33 detects the time t1 of the reference timing on the forward path and the time t2 of the reference timing on the backward path on the basis of the output voltage of the PD 16 acquired by the output voltage acquirer 32.

In step S22, the temperature acquirer 34 acquires a physical quantity such as current or voltage corresponding to the temperature of the PD 16 detected by the temperature sensor 17. In step S23, the light amount acquirer 35 acquires a physical quantity such as current or voltage corresponding to the light amount of the laser from the light source device 12 detected by the light amount sensor 18. Note that, as illustrated in FIG. 12, the processing in steps S22 and S23 can be performed in parallel.

In step S24, the corrector 36 obtains the correction times (the forward path correction time Δt1 and the backward path correction time Δt2) on the basis of an environmental change, that is, at least one of changes in the drive frequency of the light deflector 13, the physical quantity corresponding to the temperature of the PD 16 acquired by the temperature acquirer 34, and the physical quantity corresponding to the light amount of the laser from the light source device 12 acquired by the light amount acquirer 35.

Note that, as illustrated in FIG. 12, the processing of step S21 and the processing of steps S22 to S24 can be performed in parallel.

In step S25, the controller 30 acquires information on the correction time obtained by the corrector 36 and generates a control signal on the basis of the optical scanning information and the correction time. The drive signal output unit 31 outputs a drive signal to the light source device 12 in accordance with the input control signal such that the forward path image is drawn at time t1+Δt1 and the backward path image is drawn at time t2+Δt2.

In step S26, the light source device 12 draws the forward and backward images according to the drive signal output from the drive signal output unit 31.

Image Projection Apparatus

Next, the image projection apparatus to which the control device 11 of the present embodiment is applied will be described in detail with reference to FIGS. 13 and 14. FIG. 13 is a schematic diagram according to an embodiment of an automobile 400 equipped with a head-up display apparatus 500 which is an example of the image projection apparatus. Meanwhile, FIG. 14 is a schematic diagram of an example of the head-up display apparatus 500.

The image projection apparatus is an apparatus that projects an image by optical scanning and an example thereof is a head-up display apparatus. As illustrated in FIG. 13, the head-up display apparatus 500 is installed, for example, in the vicinity of a windshield 401 of the automobile 400. Projection light L emitted from the head-up display apparatus 500 is reflected on the windshield 401 and heads toward an observer (driver 402) which is a user.

As a result, the driver 402 can visually recognize an image or the like projected by the head-up display apparatus 500 as a virtual image. Note that a configuration may be adopted in which a combiner is installed on an inner wall surface of the windshield such that the virtual image can be visually recognized by the user through the projection light reflected on the combiner.

As illustrated in FIG. 14, in the head-up display apparatus 500, the laser light is emitted from the red, green, and blue laser light sources 501R, 501G, and 501B. The emitted laser light passes through an incident optical system including collimator lenses 502, 503, and 504 provided for the respective laser light sources, two dichroic mirrors 505 and 506, and a light amount adjustment unit 507 and thereafter, is deflected on the light deflector 13 having the reflecting surface 14. Then, the deflected laser light passes through a projection optical system including a free-form surface mirror 509, an intermediate screen 510, and a projection mirror 511 and is projected on a screen. In the head-up display apparatus 500 described above, the laser light sources 501R, 501G, and 501B, the collimator lenses 502, 503, and 504, and the dichroic mirrors 505 and 506 are unitized by an optical housing as a light source unit 530 corresponding to the light source device 12 illustrated in FIG. 2 and so on.

The head-up display apparatus 500 projects an intermediate image displayed on the intermediate screen 510 onto the windshield 401 of the automobile 400, thereby causing the driver 402 to visually recognize this intermediate image as a virtual image. The laser light of the respective colors emitted from the laser light sources 501R, 501G, and 501B is converted to substantially collimated light by the collimator lenses 502, 503, and 504, respectively, and is synthesized by the two dichroic mirrors 505 and 506. The synthesized laser light is two-dimensionally scanned by the light deflector 13 having the reflecting surface 14 after the light amount is adjusted by the light amount adjustment unit 507. The projection light L two-dimensionally scanned by the light deflector 13 is reflected on the free-form surface mirror 509 to correct distortion and thereafter, is focused on the intermediate screen 510 to display an intermediate image. The intermediate screen 510 is constituted by a microlens array in which microlenses are two-dimensionally arranged and enlarges the projection light L incident on the intermediate screen 510 in units of microlenses. In addition, the laser light emitted from the light source unit 530 is detected by the PD 16 installed on an end side of the intermediate screen 510.

The light deflector 13 causes the reflecting surface 14 to move back and forth in two axial directions and two-dimensionally scans the projection light L incident on the reflecting surface 14. This drive control by the light deflector 13 is performed in synchronization with the light emission timing of the laser light sources 501R, 501G, and 501B The head-up display apparatus 500 as an example of the image projection apparatus has been described up to this point. However, the image projection apparatus is only required to be an apparatus that projects an image by performing optical scanning with the light deflector 13 having the reflecting surface 14. For example, the image projecting apparatus can be similarly applied to a projector that is placed on a desk or the like and projects an image on a display screen, and a head mounted display apparatus that is equipped on a mounting member to be mounted on the head of a viewer or the like and projects an image onto a reflective/transmissive screen of the mounting member or the eyeball as a screen. Furthermore, the image projection apparatus may be equipped not only on vehicles and mounting members but also on mobile bodies such as aircrafts, ships, and mobile robots, or on non-movable bodies such as a work robot for operating a driven object such as a manipulator without moving from its place.

Packaging

Next, packaging of the light deflector 13 controlled by the control device 11 of the present embodiment will be described with reference to FIG. 15. FIG. 15 is a schematic diagram of an example of a packaged light deflector.

As illustrated in FIG. 15, the light deflector 13 is packaged in such a manner that the light deflector 13 is attached to an attachment member 801 arranged inside a package member 802 and a part of the package member is covered with a transmission member 803 to be hermetically sealed. Furthermore, an inert gas such as nitrogen is sealed up within the package. As a result, deterioration of the light deflector 13 due to oxidation is suppressed and additionally, durability against changes in environment such as temperature is improved.

Next, the optical deflection system, the optical scanning system 10, and the light deflector 13 used in the image projection apparatus and the like and the control by the control device 11 of the present embodiment, which have been mentioned above, will be described in detail.

Details of Light Deflector

First, the light deflector 13 will be described in detail with reference to FIGS. 16 to 18. FIG. 16 is a plan view of a cantilever-type light deflector capable of optical deflection in two axial directions. FIG. 17 is a cross-sectional view taken along line P-P' in FIG. 16. FIG. 18 is a cross-sectional view taken along line Q-Q' in FIG. 16.

As illustrated in FIG. 16, the light deflector 13 has a mirror section 101 that reflects incident light; first driving sections 110a and 110b that are connected to the mirror section 101 and drive the mirror section 101 around a first axis parallel to a Y axis; a first supporting section 120 that supports the mirror section 101 and the first driving sections 110a and 110b; second driving sections 130a and 130b that are connected to the first supporting section 120 and drive the mirror section 101 and the first supporting section 120 around a second axis parallel to an X axis; a second supporting section 140 that supports the second driving sections 130a and 130b; and an electrode connection section 150 that electrically connects the first driving sections 110a and 110b and the second driving sections 130a and 130b to the control device 11.

The light deflector 13 is formed by, for example, molding one silicon on insulator (SOI) substrate by etching processing or the like and forming, on the molded substrate, the reflecting surface 14, first piezoelectric driving sections 112a and 112b, second piezoelectric driving sections 131a to 131f and 132a to 132f, the electrode connection section 150, and so on, whereby the respective constituent sections are integrally formed. Note that each of the above-described constituent sections may be formed after the molding of the SOI substrate or during the molding of the SOI substrate.

The SOI substrate is a substrate in which a silicon oxide layer 162 is provided on top of a first silicon layer made of single crystal silicon (Si) and a second silicon layer made of single crystal silicon is further provided on top of this silicon oxide layer 162. Hereinafter, the first silicon layer is referred to as a silicon supporting layer 161 and the second silicon layer is referred to as a silicon active layer 163.

Since the thickness of the silicon active layer 163 in a Z axis direction is small with respect to the X axis direction or the Y axis direction, a member constituted only by the silicon active layer 163 includes a function as an elastic section having elasticity.

Incidentally, the SOI substrate is not necessarily required to have a planar shape and, for example, may have a curvature. In addition, a member used for forming the light deflector 13 is not limited to the SOI substrate as long as it is a substrate that can be molded integrally by etching processing or the like and can partially have elasticity.

The mirror section 101 includes, for example, a mirror section base body 102 having a circular shape and the reflecting surface 14 formed on a +Z side surface of the mirror section base body 102. The mirror section base body 102 is constituted by, for example, the silicon active layer 163. The reflecting surface 14 is made of a metal thin film containing, for example, aluminum, gold, or silver. In the mirror section 101, a rib for reinforcing the mirror section may be formed on a −Z side surface of the mirror section base body 102. The rib is constituted by, for example, the silicon supporting layer 161 and the silicon oxide layer 162 and can suppress distortion of the reflecting surface 14 caused by rotation.

The first driving sections 110a and 110b include two torsion bars 111a and 111b and the first piezoelectric driving sections 112a and 112b, respectively. One end of each of the torsion bars 111a and 111b is connected to the mirror section base body 102 and each torsion bar extends in a first axis direction and rotatably supports the mirror section 101. One end of each of the first piezoelectric driving sections 112a and 112b is connected to each of the torsion bars 111a and 111b, respectively, and another end thereof is connected to an inner circumferential portion of the first supporting section 120.

As illustrated in FIG. 17, the torsion bars 111a and 111b are constituted by the silicon active layer 163. In addition, the first piezoelectric driving sections 112a and 112b are configured by sequentially forming a lower electrode 201, a piezoelectric section 202, and an upper electrode 203 on a +Z side surface of the silicon active layer 163 which is an elastic section. The upper electrode 203 and the lower electrode 201 are made of, for example, gold (Au) or platinum (Pt). The piezoelectric section 202 is made of, for example, lead titanate zirconate (PZT) which is a piezoelectric material.

Returning to FIG. 16, the first supporting section 120 is, for example, a rectangular supporting body constituted by the silicon supporting layer 161, the silicon oxide layer 162, and the silicon active layer 163 and formed so as to surround the mirror section 101.

For example, the second driving sections 130a and 130b are constituted by the plurality of second piezoelectric driving sections 131a to 131f and 132a to 132f coupled to each other so as to be folded back, respectively, and one end of each of the second driving sections 130a and 130b is connected to an outer circumferential portion of the first supporting section 120 and another end thereof is connected to an inner circumferential portion of the second supporting section 140. At this time, a connecting portion between the second driving section 130a and the first supporting section 120 and a connecting portion between the second driving section 130b and the first supporting section 120, and additionally, a connecting portion between the second driving section 130a and the second supporting section 140 and a connecting portion between the second driving section 130b and the second supporting section 140 are point symmetrical with respect to the center of the reflecting surface 14.

As illustrated in FIG. 18, the second driving sections 130a and 130b are configured by sequentially forming the lower electrode 201, the piezoelectric section 202, and the upper electrode 203 on the +Z side surface of the silicon active layer 163 which is an elastic section. The upper electrode 203 and the lower electrode 201 are made of, for example, gold (Au) or platinum (Pt). The piezoelectric section 202 is made of, for example, lead titanate zirconate (PZT) which is a piezoelectric material.

Returning to FIG. 16, the second supporting section 140 is, for example, a rectangular supporting body constituted by the silicon supporting layer 161, the silicon oxide layer 162, and the silicon active layer 163 and formed so as to surround the mirror section 101, the first driving sections 110a and 110b, the first supporting section 120, and the second driving sections 130a and 130b.

For example, the electrode connection section 150 is formed on a +Z side surface of the second supporting section 140 and electrically connected to the respective upper electrodes 203 and the respective lower electrodes 201 of the first piezoelectric driving sections 112a and 112b and the second piezoelectric driving sections 131a to 131f and 132a to 132f, and the control device 11 via electrode wiring made of aluminum (Al) or the like. Note that each of the upper electrode 203 and the lower electrode 201 may be directly connected to the electrode connection section 150 or may be indirectly connected thereto by, for example, connecting the electrodes to each other.

In addition, in the present embodiment, a case where the piezoelectric section 202 is formed only on one surface (the +Z side surface) of the silicon active layer 163 which is an elastic section has been described as an example, but the piezoelectric section 202 may be provided on another surface (e.g., −Z side surface) of the elastic section or on both of the one surface and the another surface of the elastic section.

Meanwhile, as long as the mirror section 101 can be rotationally driven around the first axis or around the second axis, the shape of each constituent section is not limited to the shape according to the embodiment. For example, the torsion bars 111a and 111b and the first piezoelectric driving sections 112a and 112b may have a shape having a curvature.

Furthermore, an insulating layer made of a silicon oxide film may be formed on at least one of a +Z side surface of the upper electrode 203 of each of the first driving sections 110a and 110b, a +Z side surface of the first supporting section 120, a +Z side surface of the upper electrode 203 of each of the second driving sections 130a and 130b, and a +Z side surface of the second supporting section 140. At this time, when the electrode wiring is provided on the insulating layer and the insulating layer is partially removed as an opening or the insulating layer is not formed in a connecting spot where the upper electrode 203 or the lower electrode 201 and the electrode wiring are connected, it is possible to increase the degree of freedom in designing the first driving sections 110a and 110b, the second driving sections 130a and 130b, and the electrode wiring and additionally, to suppress a short circuit due to the contact between the electrodes. Note that the insulating layer is only required to be a member having an insulating property and may include a function as an antireflective material.

Details of Control by Control Device

Next, control by the control device 11 that drives the first driving sections 110a and 110b and the second driving sections 130a and 130b of the light deflector 13 will be described in detail.

When a positive or negative voltage is applied in a polarization direction, the piezoelectric sections 202 individually included in the first driving sections 110a and 110b and the second driving sections 130a and 130b are deformed (for example, expanded or contracted) proportional to a potential of the applied voltage, whereby a so-called inverse piezoelectric effect is exerted. The first driving sections 110a and 110b and the second driving sections 130a and 130b rotationally drive the mirror section 101 by utilizing the above-mentioned inverse piezoelectric effect.

At this time, an angle at which a light beam incident on the reflecting surface 14 of the mirror section 101 is deflected is called a deflection angle. The deflection angle while the voltage is not applied to the piezoelectric section 202 is set to zero and a case where an angle of deflection is larger than this angle is defined as the positive deflection angle, while a case where the angle of deflection is smaller than this angle is defined as a negative deflection angle.

First, control by the control device 11 to drive the first driving sections 110a and 110b will be described. In the first driving sections 110a and 110b, when a drive voltage is applied in parallel to the piezoelectric sections 202 included in the first piezoelectric driving sections 112a and 112b via the upper electrodes 203 and the lower electrodes 201, the respective piezoelectric sections 202 are deformed. Due to actions by this deformation of the piezoelectric sections 202, the first piezoelectric driving sections 112a and 112b are bent and deformed. As a result, a rotational driving force around the first axis acts on the mirror section 101 via the twist of the two torsion bars 111a and 111b and accordingly, the mirror section 101 rotates around the first axis. The drive voltage applied to the first driving sections 110a and 110b is controlled by the control device 11.

Therefore, when a drive voltage of a predetermined sinusoidal waveform is applied by the control device 11 in parallel to the first piezoelectric driving sections 112a and 112b included in the first driving sections 110a and 110b, the mirror section 101 can be rotated around the first axis at a cycle of the drive voltage of the predetermined sinusoidal waveform.

In particular, when the frequency of the sinusoidal waveform voltage is set to about 20 kHz, which is about the same as the resonance frequency of the torsion bars 111a and 111b, mechanical resonance due to the twist of the torsion bars 111a and 111b occurs and, by utilizing this, the mirror section 101 can be resonantly vibrated at about 20 kHz.

Next, control by the control device 11 to drive the second driving sections 130a and 130b will be described with reference to FIGS. 19 and 20.

FIG. 19 is a schematic view schematically expressing the driving of the second driving section 130a or 130b of the light deflector 13. The area indicated by hatching is the mirror section 101 and so on.

Among the plurality of second piezoelectric driving sections 131a to 131f included in the second driving section 130a, the second piezoelectric driving sections of even numbers counted from the second piezoelectric driving section (131a) closest to the mirror section 101, that is, the second piezoelectric driving sections 131b, 131d, and 131f are defined as a piezoelectric driving section group A. Additionally, among the plurality of second piezoelectric driving sections 132a to 132f included in the second driving section 130b, the second piezoelectric driving sections of odd numbers counted from the second piezoelectric driving section (132a) closest to the mirror section 101, that is, the second piezoelectric driving sections 132a, 132c, and 132e are likewise defined as the piezoelectric driving section group A. When the drive voltage is applied in parallel to the piezoelectric driving section group A, the piezoelectric driving section group A is bent and deformed in the same direction as illustrated in (a) of FIG. 19 and the mirror section 101 rotates around the second axis such that the positive deflection angle is obtained.

Meanwhile, among the plurality of second piezoelectric driving sections 131a to 131f included in the second driving section 130a, the second piezoelectric driving sections of odd numbers counted from the second piezoelectric driving section (131a) closest to the mirror section 101, that is, the second piezoelectric driving sections 131a, 131c, and 131e are defined as a piezoelectric driving section group B. Additionally, among the plurality of second piezoelectric driving sections 132a to 132f included in the second driving section 130b, the second piezoelectric driving sections of even numbers counted from the second piezoelectric driving section (132a) closest to the mirror section 101, that is, the second piezoelectric driving sections 132b, 132d, and 132f are likewise defined as the piezoelectric driving section group B. When the drive voltage is applied in parallel to the piezoelectric driving section group B, the piezoelectric driving section group B is bent and deformed in the same direction as illustrated in (c) of FIG. 19 and the mirror section 101 rotates around the second axis such that the negative deflection angle is obtained.

In the second driving section 130a or the second driving section 130b, by bending and deforming the plurality of piezoelectric sections 202 included in the piezoelectric driving section group A or the plurality of piezoelectric sections 202 included in the piezoelectric driving section group B as illustrated in (a) and (c) of FIG. 19, it is possible to accumulate the rotation amount caused by the bending deformation and to increase the deflection angle of the mirror section 101 around the second axis.

For example, as illustrated in FIG. 16, the second driving sections 130a and 130b are point-symmetrically connected to the first supporting section 120 with respect to the center point of the first supporting section 120. Therefore, when the drive voltage is applied to the piezoelectric driving section group A, a driving force for moving a connecting section between the first supporting section 120 and the second driving section 130a in a +Z direction is generated in the second driving section 130a, while a driving force for moving a connecting section between the first supporting section 120 and the second driving section 130b in a −Z direction is generated in the second driving section 130b, whereby the movable amount is accumulated such that the deflection angle of the mirror section 101 around the second axis can be increased.

In addition, as illustrated in (b) of FIG. 19, when no voltage is applied or a rotation force of the mirror section 101 by the piezoelectric driving section group A because of voltage application and a rotation force of the mirror section 101 by the piezoelectric driving group B because of voltage application are balanced, the deflection angle becomes zero.

By applying the drive voltage to the second piezoelectric driving sections 131a to 131f and 132a to 132f such that (a) to (c) of FIG. 19 are continuously repeated, the mirror section 101 can be rotated around the second axis.

Drive Voltage

The drive voltage applied to the second driving sections 130a and 130b is controlled by the control device 11. A drive voltage applied to the piezoelectric driving section group A (hereinafter referred to as drive voltage A) and a drive voltage applied to the piezoelectric driving section group B (hereinafter, referred to as drive voltage B) will be described with reference to FIG. 20.

In FIG. 20, (a) is an example of a waveform of the drive voltage A applied to the piezoelectric driving section group A of the light deflector; (b) is an example of a waveform of the drive voltage B applied to the piezoelectric driving section group B of the light deflector; and (c) is a diagram in which the waveform of the drive voltage A and the waveform of the drive voltage B are superimposed.

As illustrated in (a) of FIG. 20, the waveform of the drive voltage A applied to the piezoelectric driving section group A is, for example, a sawtooth waveform and the frequency thereof is, for example, 60 Hz. Additionally, when the time width of a rising period during which the voltage value increases from the minimum value to the next maximum value is defined as TrA and the time width of a falling period during which the voltage value decreases from the maximum value to the next minimum value is defined as TfA, a ratio of TrA:TfA=9:1 is set in advance for the waveform of the drive voltage A, for example. At this time, the ratio of TrA to one cycle is referred to as symmetry of the drive voltage A.

As illustrated in (b) of FIG. 20, the waveform of the drive voltage B applied to the piezoelectric driving section group B is, for example, a sawtooth waveform and the frequency thereof is, for example, 60 Hz. Additionally, when the time width of a rising period during which the voltage value increases from the minimum value to the next maximum value is defined as TrB and the time width of a falling period during which the voltage value decreases from the maximum value to the next minimum value is defined as TfB, a ratio of TfB:TrB=9:1 is set in advance for the waveform of the drive voltage B, for example. At this time, the ratio of TfB to one cycle is referred to as symmetry of the drive voltage B.

Meanwhile, for example, a cycle TA of the waveform of the drive voltage A and a cycle TB of the waveform of the drive voltage B are set to be the same as illustrated in (c) of FIG. 20.

Note that the above-described sawtooth waveforms of the drive voltage A and the drive voltage B are generated by, for example, superimposing sine waves. In addition, in the present embodiment, a drive voltage having the sawtooth waveform is used as the drive voltages A and B. However, the drive voltage is not limited to this and it is also possible to change the waveform according to the device characteristics of the light deflector 13, for example, a drive voltage having a waveform obtained by rounding the peaks of the sawtooth waveform, or a drive voltage having a waveform obtained by forming a linear region of the sawtooth waveform as a curve. In this case, the symmetry corresponds to the ratio of the rising time to one cycle or the ratio of the falling time to one cycle. At this time, it may be set arbitrarily which of the rising time and the falling time is used as a reference.

Modification

In the above embodiment, the light deflector 13 uses a cantilever type light deflector 13 in which the first piezoelectric driving sections 112a and 112b extend in a +X direction from the torsion bars 111a and 111b as illustrated in FIG. 16. However, the light deflector 13 is not limited to this as long as a configuration is adopted in which the reflecting surface 14 is rotated by the piezoelectric section 202 to which voltage is applied. For example, as illustrated in FIG. 21, a double-supported-type light deflector having first piezoelectric driving sections 212a and 212b extending in the +X direction from torsion bars 211a and 211b and first piezoelectric driving sections 212c and 212d extending in a −X direction therefrom may be used.

Although the embodiments of the present invention and its modifications have been described thus far, the above-described embodiments and modifications thereof merely indicate application examples of the present invention. The present invention is not limited to the above-described embodiments and modifications thereof as they are and can be embodied by making various modifications and changes in the implementation stage without departing from the gist thereof. For example, in the above embodiments and modifications thereof, the control device 11 always applies a drive voltage of a waveform having a positive voltage value to the piezoelectric section 202. However, the control device 11 is not limited to this as long as a configuration that causes deformation of the piezoelectric section 202 when a drive voltage is applied to the piezoelectric section 202 is adopted. As an example, the control device 11 may always apply a drive voltage of a waveform having a negative voltage value to the piezoelectric section 202, or alternatively, may apply a positive voltage value and a negative voltage value alternately.

Additionally, in the above embodiments and modifications, when at least one of the functional sections of the control device 11 is realized by executing a program, the program is provided by being incorporated in advance in a ROM or the like. A program executed by the control device 11 according to the embodiments and the modifications described above may be configured so as to be provided by being recorded in a computer-readable recording medium such as a compact disc read only memory (CD-ROM), a flexible disc (FD), a compact disk-recordable (CD-R) or a digital versatile disc (DVD), as a file in an installable format or in an executable format. The program executed by the control device 11 according to the embodiments and the modifications described above may be configured so as to be saved and kept on a computer connected to a network such as the Internet and provided by being downloaded via the network. The program executed by the control device 11 according to the embodiments and the modifications described above may be configured so as to be provided or distributed via a network such as the Internet. In addition, the program executed by the control device 11 according to the embodiments and the modifications described above has a module configuration including at least one of the above-described functional sections and, as actual hardware, the CPU 20 reads the program from the above-described storage apparatus (for example, the ROM 22) to execute, whereby each of the above-described functional sections is loaded on a main storage apparatus (for example, the RAM 21) and is generated.

REFERENCE SIGNS LIST

10 Optical scanning system
11 Control device
12 Light source device
13 Light deflector
14 Reflecting surface
15 Surface to be scanned
16 Photodiode (PD)
16a First light receiving surface
16b Second light receiving surface
17 Temperature sensor
18 Light amount sensor
20 CPU
21 RAM
22 ROM
23 FPGA
24 External I/F
25 Light source device driver
26 Light deflector driver
27 First sensor I/F
28 Second sensor I/F
29 Third sensor I/F
30 Controller
31 Drive signal output unit
32 Output voltage acquirer
33 Reference timing detector
34 Temperature acquirer
35 Light amount acquirer
36 Corrector
50 Scanning area
50a Drawing area
50b Non-drawing area
51 Light receiving image
101 Mirror section
102 Mirror section base body
110a, 110b First driving section
111a, 111b Torsion bar
112a, 112b First piezoelectric driving section
120 First supporting section
130a, 130b Second driving section
131a to 131f Second piezoelectric driving section
132a to 132f Second piezoelectric driving section
140 Second supporting section
150 Electrode connection section
161 Silicon supporting layer
162 Silicon oxide layer 163 Silicon active layer
201 Lower electrode
202 Piezoelectric section
203 Upper electrode
211a, 211b Torsion bar
212a to 212d First piezoelectric driving section
400 Automobile
401 Windshield
402 Driver
500 Head-up display apparatus
501R, 501G, 501B Laser light source
502 to 504 Collimator lens
505, 506 Dichroic mirror
507 Light amount adjustment unit
509 Free-form surface mirror
510 Intermediate screen
511 Projection mirror
530 Light source unit
801 Attachment member
802 Package member
803 Transmission member

CITATION LIST

Patent Literature

PTL 1: Japanese Unexamined Patent Application Publication No. 2010-79198

The invention claimed is:

1. A control device comprising:
an acquirer configured to acquire an output voltage output from a light detector having a light receiving surface on which laser light scanned by a light source device and a light deflector is received;
a timing detector configured to separately detect reference timings of the laser light on forward and backward paths in a scanning direction based on the output voltage corresponding to the light receiving surface acquired by the acquirer;
a controller configured to generate a control signal for causing the light source device and the light deflector to draw a forward path image on a surface to be scanned from time obtained by adding a first correction time to the reference timing on the forward path and to draw a backward path image on the surface to be scanned from time obtained by adding a second correction time to the reference timing on the backward path; and
a driver configured to draw the forward path image and the backward path image by driving the light deflector to scan the laser light and driving an irradiation action of the light source device in synchronization with the action of the scanning of the laser light, based on the control signal.

2. The control device according to claim 1, wherein
the acquirer is further configured to acquire the output voltage output from the light detector having a plurality of light receiving surfaces on which the laser light is received, and
the timing detector is further configured to separately detect the reference timings of the laser light on the forward and backward paths in the scanning direction based on output voltages individually corresponding the plurality of light receiving surfaces acquired by the acquirer.

3. The control device according to claim 2, wherein the acquirer is further configured to acquire the output voltages from the light detector, which has two light receiving surfaces arranged along the scanning direction of the laser light, one of which is a first light receiving surface and the other of which is a second light receiving surface whose area is larger than the area of the first light receiving surface.

4. The control device according to claim 3, wherein
the acquirer is further configured to separately acquire a first output voltage output by the light detector when the first light receiving surface receives the laser light and a second output voltage output by the light detector when the second light receiving surface receives the laser light, and
when a path through which the laser light is scanned from the first light receiving surface to the second light receiving surface is defined as the forward path, the timing detector is configured to detect a time when the first output voltage becomes equal to or lower than the second output voltage after the laser light is detected at the first light receiving surface, as the reference timing on the forward path, and detect a time when the second output voltage becomes equal to or lower than the first output voltage after the laser light is detected at the second light receiving surface, as the reference timing on the backward path.

5. The control device according to claim 3, wherein the acquirer is further configured to acquire the second output voltage from the second light receiving surface as a voltage smaller than the first output voltage from the first light receiving surface, from among the acquired output voltages, when the light detector does not receive the laser light.

6. The control device according to claim 1, wherein
when the laser light emitted from the light source device is received by the light detector, the controller is further configured to generate a control signal for causing the light source device to emit laser light on a short wavelength side from among the laser light that can be emitted by the light source device, and
the driver is further configured to cause the light source device to irradiate the light detector with the laser light on the short wavelength side in accordance with the control signal.

7. The control device according to claim 1, further comprising a corrector configured to correct at least one of the first correction time and the second correction time based on a change in a drive frequency of the light deflector by the driver.

8. The control device according to claim 1, further comprising a corrector configured to correct at least one of the first correction time and the second correction time based on a change in a temperature of the light detector.

9. The control device according to claim 1, further comprising a corrector configured to correct at least one of the first correction time and the second correction time based on a change in a light amount of the laser light emitted by the light source device.

10. An image projection apparatus comprising:
the control device according to claim 1;
the light source device;
the light deflector; and
the light detector.

11. The image projection apparatus according to claim 10, further comprising:
a projection mirror configured to project an image drawn by the laser light from the light source device deflected by the light deflector, as a virtual image; and
a combiner configured to cause the projection mirror to project an image as the virtual image.

12. A control method comprising:
acquiring an output voltage output from a light detector having a light receiving surface on which laser light scanned by a light source device and a light deflector is received;
separately detecting reference timings of the laser light on forward and backward paths in a scanning direction based on the acquired output voltage corresponding to the light receiving surface;
generating a control signal for causing the light source device and the light deflector to draw a forward path image on a surface to be scanned from time obtained by adding a first correction time to the reference timing on the forward path and to draw a backward path image on the surface to be scanned from time obtained by adding a second correction time to the reference timing on the backward path; and
drawing the forward path image and the backward path image by driving the light deflector to scan the laser light and driving an irradiation action of the light source device in synchronization with the action of the scanning of the laser light, based on the control signal.

\* \* \* \* \*